United States Patent
Gottlieb et al.

(10) Patent No.: US 10,623,486 B2
(45) Date of Patent: Apr. 14, 2020

(54) METHODS, SYSTEMS, AND MEDIA FOR PROVIDING DISTRIBUTED DATABASE ACCESS DURING A NETWORK SPLIT

(71) Applicants: Yossi Gottlieb, Klil (IL); Yoav Steinberg, Kibbutz Hanita (IL); Yiftach Shoolman, Modi'in (IL)

(72) Inventors: Yossi Gottlieb, Klil (IL); Yoav Steinberg, Kibbutz Hanita (IL); Yiftach Shoolman, Modi'in (IL)

(73) Assignee: Redis Labs Ltd., Hod Hasharon (IL)

( * ) Notice: Subject to any disclaimer, the term of this patent is extended or adjusted under 35 U.S.C. 154(b) by 974 days.

(21) Appl. No.: 15/183,689

(22) Filed: Jun. 15, 2016

(65) Prior Publication Data

US 2016/0366220 A1   Dec. 15, 2016

Related U.S. Application Data

(60) Provisional application No. 62/175,851, filed on Jun. 15, 2015.

(51) Int. Cl.

| | |
|---|---|
| *G06F 16/27* | (2019.01) |
| *G06F 16/23* | (2019.01) |
| *H04L 29/08* | (2006.01) |
| *H04L 12/24* | (2006.01) |
| *H04L 29/14* | (2006.01) |
| *H04L 29/06* | (2006.01) |

(52) U.S. Cl.
CPC ...... *H04L 67/1095* (2013.01); *G06F 16/2379* (2019.01); *G06F 16/27* (2019.01); *H04L 41/12* (2013.01); *H04L 67/02* (2013.01); *H04L 67/10* (2013.01); *H04L 67/28* (2013.01); *H04L 67/42* (2013.01); *H04L 69/08* (2013.01); *H04L 69/40* (2013.01); *H04L 41/30* (2013.01)

(58) Field of Classification Search
CPC ....................................................... G06F 16/27
See application file for complete search history.

(56) References Cited

U.S. PATENT DOCUMENTS

| | | | |
|---|---|---|---|
| 9,984,140 B1* | 5/2018 | Sukumaran | G06F 16/219 |
| 2007/0288526 A1* | 12/2007 | Mankad | G06F 16/27 |

(Continued)

OTHER PUBLICATIONS

Wikipedia, "Gossip Protocol", last edited Oct. 8, 2019, pp. 1-5, available at: http://en.wikipedia.org/wiki/Gossip_protocol.

*Primary Examiner* — Charles E Lu
(74) *Attorney, Agent, or Firm* — Byrne Poh LLP

(57) ABSTRACT

Methods, systems, and media for providing distributed database access during a network split. In some embodiments, the method comprises: receiving, at a node of N nodes, configuration information of the database which indicates which of the N nodes stores replicated shards of the database including master shards and corresponding slave shards, N being an odd number greater than one; identifying, after a network split, a subset of the N nodes which are capable of communicating with each other; receiving, by a proxy, a request to perform a write operation to an object in the database; determining that a second node included in the subset of the N nodes stores a master shard including the object; determining that the subset includes at least (N+1)/2 nodes; and causing the request to perform the write operation to be routed to the second node.

30 Claims, 29 Drawing Sheets

(56) References Cited

U.S. PATENT DOCUMENTS

| | | | | |
|---|---|---|---|---|
| 2011/0313973 A1* | 12/2011 | Srivas | ............... | H04L 65/102 |
| | | | | 707/634 |
| 2012/0330898 A1* | 12/2012 | Bk | ............... | G06F 11/2089 |
| | | | | 707/659 |
| 2013/0311426 A1* | 11/2013 | Erdogan | ............ | G06F 16/27 |
| | | | | 707/610 |
| 2013/0311441 A1* | 11/2013 | Erdogan | ............ | G06F 16/2282 |
| | | | | 707/713 |
| 2014/0025634 A1* | 1/2014 | Dennehy | ............ | G06F 16/27 |
| | | | | 707/623 |
| 2014/0279905 A1* | 9/2014 | Muniswamy-Reddy | ............ | |
| | | | | G06F 16/27 |
| | | | | 707/639 |
| 2015/0127625 A1* | 5/2015 | Bulkowski | ............ | G06F 16/27 |
| | | | | 707/703 |
| 2015/0261443 A1* | 9/2015 | Wei | ............ | G06F 3/0604 |
| | | | | 711/162 |

* cited by examiner

100

METHODS, SYSTEMS, AND MEDIA FOR PROVIDING DISTRIBUTED DATABASE ACCESS DURING A NETWORK SPLIT

CROSS-REFERENCE TO RELATED APPLICATIONS

This application claims the benefit of U.S. Provisional Patent Application No. 62/175,851, filed Jun. 15, 2015, which is hereby incorporated by reference herein in its entirety.

TECHNICAL FIELD

The disclosed subject matter relates to methods, systems, and media for providing distributed database access during a network split.

BACKGROUND

Replicating and distributing a database can increase the availability of, and speed of access to, information stored in the database by making multiple copies of the same information available for read requests, and potentially allowing read and write operations to be performed by different servers. In such a replicated distributed database there are often copies of the same information stored on servers that are not directly connected to one another, but which may be connected by one or more switches, dedicated lines, etc.

In a common replicated distributed database implementation, in order for an operation to be performed on an object, at least a majority of copies of that object must vote (through the server or servers storing the copies) to allow the operation to be performed in accordance with a given consistency model (e.g., strong consistency or eventual consistency). This is sometimes referred to as quorum-based voting. Such an implementation is typically designed so that there are an odd number of copies of each object to prevent ties in voting. For example, if there were an even number of copies of an object, than there could be a situation in which half of the servers storing the copies vote to allow an operation, and the other half do not vote (e.g., because those servers are not in communication with the other servers) or vote to inhibit the operation, thus not forming a majority of the copies of the object. This thus requires that at least three copies of each object be stored in each replicated distributed database, for example as described below in connection with FIG. 11A.

Due to the relatively high price of RAM resources (as of June 2016, RAM prices are ~200 times higher than HHD (Hard Disk Drive) and ~20 times higher than SSD (Solid State Disk)), implementing such a replicated database as an in-memory database becomes very expensive because three copies of the same object must be stored in memory.

Accordingly, it is desirable to provide new methods, systems, and media for providing distributed database access during a network split.

SUMMARY

In accordance with various embodiments of the disclosed subject matter, methods, systems, and media for providing distributed database access during a network split are provided.

In accordance with some embodiments of the disclosed subject matter, a method for providing access to information stored in a replicated distributed database is provided, the method comprising: receiving, using a hardware processor of a first node of N nodes, configuration information of the database which indicates which of the N nodes stores each of a plurality replicated shards of the database, wherein N is an odd number greater than one and wherein the replicated shards include a plurality of master shards and a plurality of slave shards that each correspond to one master shard; identifying, after a network split has occurred among the N nodes, a subset of the N nodes, including the first node, which are capable of communicating with each other; receiving, by a proxy hosted by the first node, a request to perform a write operation to an object in the database; determining that a second node of the N nodes stores a master shard that includes the object based on the configuration information; determining that the second node is included in the subset of the N nodes; determining that the subset includes at least (N+1)/2 nodes; and in response to determining that the subset includes at least (N+1)/2 nodes, causing the request to perform the write operation to be routed to the second node.

In accordance with some embodiments of the disclosed subject matter, a system for providing access to information stored in a replicated distributed database is provided, the system comprising: at least one hardware processor that is programmed to: receive, at a first node of N nodes, configuration information of the database which indicates which of the N nodes stores each of a plurality replicated shards of the database, wherein N is an odd number greater than one and wherein the replicated shards include a plurality of master shards and a plurality of slave shards that each correspond to one master shard; identify, after a network split has occurred among the N nodes, a subset of the N nodes, including the first node, which are capable of communicating with each other; receive, by a proxy hosted by the first node, a request to perform a write operation to an object in the database; determining that a second node of the N nodes stores a master shard that includes the object based on the configuration information; determining that the second node is included in the subset of the N nodes; determining that the subset includes at least (N+1)/2 nodes; and in response to determining that the subset includes at least (N+1)/2 nodes, causing the request to perform the write operation to be routed to the second node.

In accordance with some embodiments of the disclosed subject matter, a non-transitory computer-readable medium containing computer executable instructions that, when executed by a processor, cause the processor to perform a method for providing access to information stored in a replicated distributed database is provided, the method comprising: receiving, by a first node of N nodes, configuration information of the database which indicates which of the N nodes stores each of a plurality replicated shards of the database, wherein N is an odd number greater than one and wherein the replicated shards include a plurality of master shards and a plurality of slave shards that each correspond to one master shard; identifying, after a network split has occurred among the N nodes, a subset of the N nodes, including the first node, which are capable of communicating with each other; receiving, by a proxy hosted by the first node, a request to perform a write operation to an object in the database; determining that a second node of the N nodes stores a master shard that includes the object based on the configuration information; determining that the second node is included in the subset of the N nodes; determining that the subset includes at least (N+1)/2 nodes; and in response to determining that the subset includes at least $(N+1)/2$ nodes, causing the request to perform the write operation to be routed to the second node.

In some embodiments, the method further comprises: electing, with the N nodes, a node as a cluster manager node before the network split occurs; and generating, by the node elected as the cluster manager node, the configuration information of the database.

In some embodiments, the method further comprises: determining, with the subset of the N nodes after the network split has occurred, that the node elected as the cluster manager node is not among the subset of N nodes; and in response to determining that the that the node elected as the cluster manager node is not among the subset of the N nodes, electing a new node from the subset of the N nodes as the new cluster manager node.

In some embodiments, the method further comprises: determining, by the node elected as the new cluster manager node, that a slave shard is stored by one of the subset of the N nodes but that the master shard to which it corresponds is not stored by one of the subset of the N nodes; and updating the configuration information to indicate that the slave shard is to be re-designated as a master shard, and that the master shard to which it corresponds is to be re-designated as a slave shard.

In some embodiments, the method further comprises: receiving, at a third node of the N nodes, the configuration information; identifying, after a network split has occurred, a second subset of the N nodes, including the third node, which are capable of communicating with each other; receiving, by a proxy hosted by the third node, a request to perform a write operation to a second object in the database; determining that the second subset includes less than $(N+1)/2$ nodes; and in response to determining that the subset includes less than $(N+1)/2$ nodes, inhibiting the write operation from being performed.

In some embodiments, the method further comprises: receiving, by the proxy hosted by the third node, a request to perform a read operation to a third object in the database; determining which of the N nodes stores a master shard that includes the third object; determining which of the N nodes stores a slave shard that includes the third object; determining whether both the master shard storing the third object and the slave shard storing the third object are stored by nodes in the second subset of the N nodes; and in response to determining that both the second master shard and the slave shard are stored by nodes in the second subset of the N nodes, causing the read operation to be routed to the node storing the master shard that includes the third object or the node storing the slave shard that includes the third object.

In some embodiments, identifying the subset of the N nodes which the first node is still capable of communicating with comprises: receiving, at the first node during a period of time subsequent to the network split occurring, a message from each node in the subset of the N nodes, wherein the message indicates at least that the first node is in communication with the node that sent the message; and determining, at the first node, that a message has not been received from each node not in the subset of the N nodes during the period of time subsequent to the network split.

In some embodiments, the request to perform the write operation to the object in the database includes a key corresponding to the object.

In some embodiments, the database is a non-relational database.

In some embodiments, the database is an in-memory non-relational database.

BRIEF DESCRIPTION OF THE DRAWINGS

Various objects, features, and advantages of the disclosed subject matter can be more fully appreciated with reference to the following detailed description of the disclosed subject matter when considered in connection with the following drawings, in which like reference numerals identify like elements.

DETAILED DESCRIPTION

Figure 1:
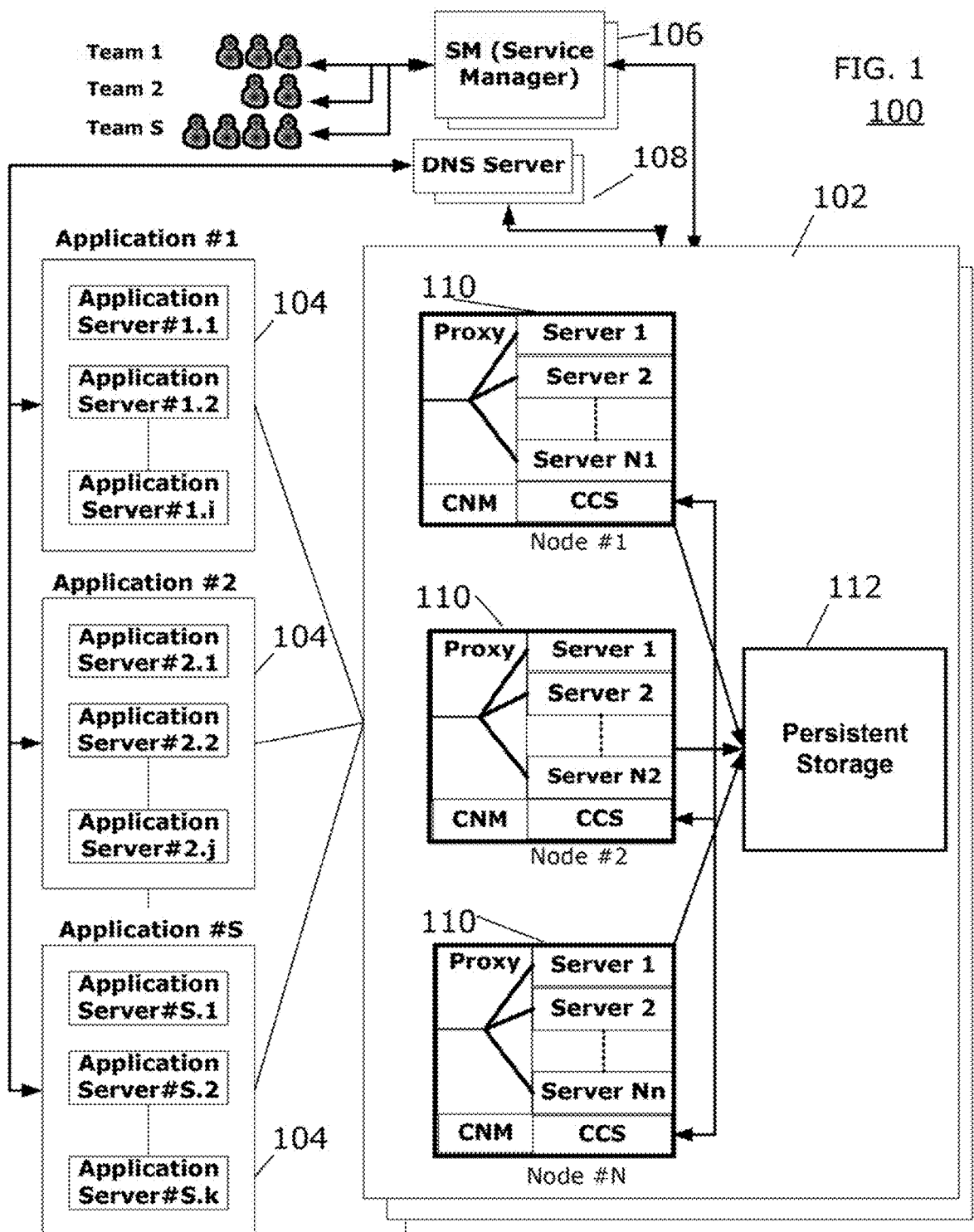
FIG. 1 is an example of a diagram of a cluster architecture in accordance with some embodiments of the disclosed subject matter.

In accordance with various embodiments, mechanisms (which can include methods, systems, and/or media) for providing distributed database access during a network split are provided.

In some embodiments, the mechanisms described herein can facilitate implementation of a replicated distributed database using an even number of copies of each object. In some embodiments of such a replicated distributed database, a cluster including an odd number of nodes (which may be located local to each other and/or remote from each other)

can store shards that make up the database. In such embodiments, the nodes can collectively store two copies of each shard, with one copy being designated as the master shard which can perform both read and write operations, and another copy being designated as a slave shard which can perform read operations and can act as a backup of the master shard.

In some embodiments, a request to perform an operation on one or more objects stored in the database can be received at a node of the cluster (e.g., by a proxy hosted by the receiving node). During normal operation, the proxy hosted by the receiving node can route the request to a node or nodes that store one or more shards that include the one or more objects. For example, if a GET request with a key that references a particular object is received, the proxy hosted by the receiving node can determine in which shard the object referenced by the key is stored, and can route the GET request to a node that stores either the master version of that shard or the slave version of that shard (e.g., based on database configuration information, as described below in connection with FIGS. 2 and 9). Note that a corresponding master shard and slave shard are typically stored at separate nodes such that (e.g., in the case of a network split) the loss of a single node does not inhibit access to the objects stored in the corresponding master shard and slave shard.

However, in some cases, the node at which the request is received cannot communicate with all of the nodes that make up the cluster that store the distributed database. As described below in connection with FIG. 8, such a situation can be referred to as a network split. In some embodiments, when the proxy hosted by the receiving node receives a request during a network split situation (or optionally whenever a request is received), the node can determine whether it is on the majority side of the network split or a minority side of the network split (e.g., again based on database configuration information). In some such embodiments, if the node hosting the proxy is on the majority side, the proxy can forward read requests to either the node storing the slave shard or the node storing the master shard if those nodes are also on the majority side of the network split. Additionally, in some embodiments, if the node hosting the proxy is on the majority side of the network split, the proxy can forward write requests to the node storing the master shard if it is also on the majority side of the network split. Conversely, in some embodiments, if the node hosting the proxy is on the minority side, the proxy can forward read requests to either the node storing the slave shard or the node storing the master shard if both of those nodes are also on the minority side of the network split, but can inhibit write requests from being performed, even if the master shard is also on the minority side of the network split. Alternatively, in some embodiments, if the node hosting the proxy is on the minority side of the network split, it can inhibit both read and write requests from being forwarded or acted upon. Note that, as described herein, the proxy is generally described as forwarding or routing a request to another node, however, in some cases the node that hosts the proxy can also store a master shard or a slave shard referenced by a received request. In such cases, the proxy can route the request within the node, rather than to another node.

In accordance with some embodiments, an example of in-memory non-relational database can be implemented as a system 100 as illustrated in FIG. 1. As shown, system 100 can include one or more clusters 102, one or more applications 104, one or more service managers 106, and one or more domain name servers 108. Clusters 102 can be one or more clusters of nodes 110 for providing in-memory data storage as well as related functionality as described further below. Applications 104 can be one or more applications that use data and related information stored in nodes 102. Service manager (SM) 106 can be an entity that manages the user interaction with the system, as well as maps user configuration to cluster resources. The SM can be designed to support single- and multi-tenancy modes of operation, and can allow the system to be supplied as a service. The SM can also communicate with a cluster node manager of a node (described below) for provisioning, aggregating service statistics and alarms. When deployed as a service, the SM can also be responsible for usage reports and billing. DNS 108 can provide a mechanism for domain name server functions as known in the art.

In general, the mechanisms described herein are described in connection with an in-memory, non-relational database that can store all of (or a major part of) a user's dataset in system memory (e.g., RAM Memory). However, the mechanisms described herein can be used with any suitable non-relational database that can store a user's dataset using any suitable memory or storage techniques such as Persistent Memory (e.g., 3D XPoint memory available from INTEL and MICRON), Flash, solid-state drives, hard disc drives, any other suitable memory or storage technique, or any suitable combination thereof. In general, there is a tradeoff between speed and cost, with memory or storage techniques that have faster access times and faster write times typically being more costly for the same amount of storage capacity than those with slower access times and/or slower write times.

Figure 2:
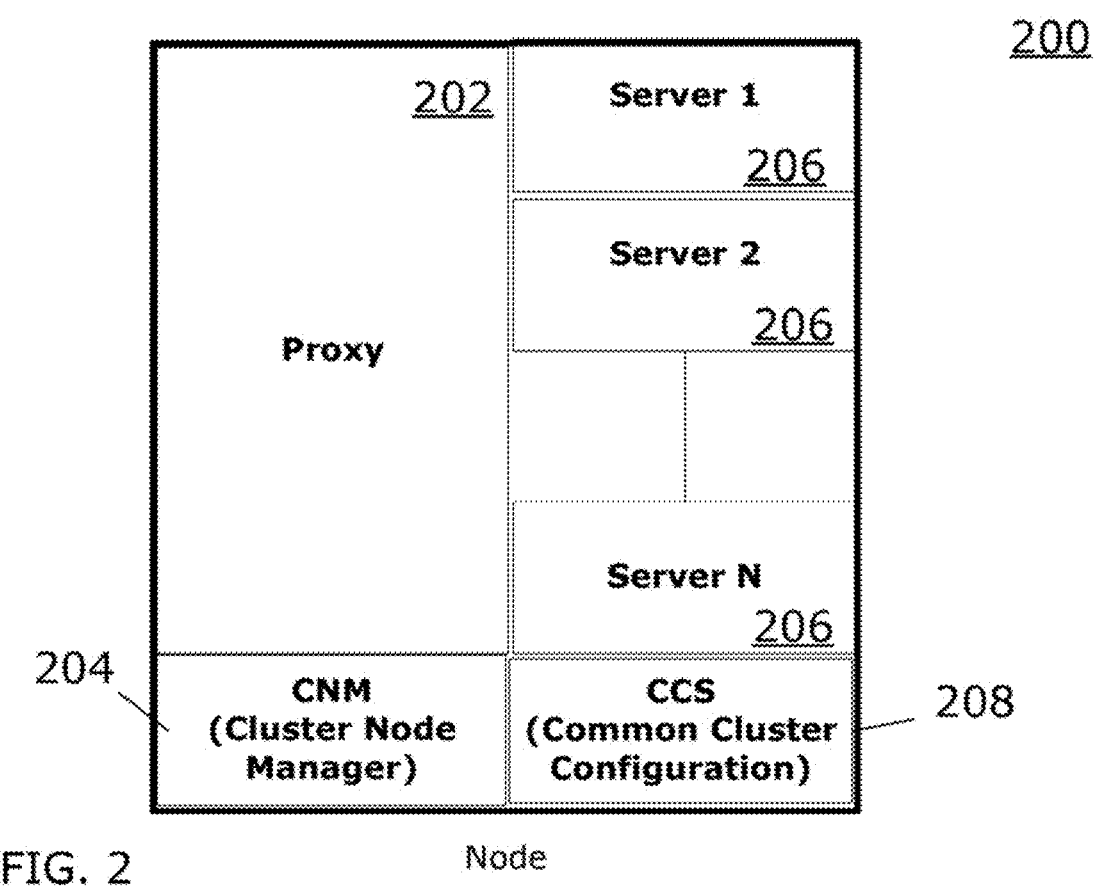
FIG. 2 is an example of a diagram of a node architecture in accordance with some embodiments of the disclosed subject matter.

Turning to FIG. 2, an example of a node 200 that can be used as a node 110 in a cluster 102 in accordance with some embodiments is illustrated. As shown, node 200 can include a proxy 202, a cluster node manager (CNM) 204, zero or more servers 206, and common cluster storage 208. As described more fully below, in some embodiments, server(s) 206 can be used to provide in-memory non-relational database functionality and any other suitable server process(es). In some embodiments, the server(s) can be based on the open-source Redis server with enhanced functionality. In some embodiments, the server(s) can represent one of the following options: (1) a Memcached Bucket; (2) a partition of a Memcached Bucket; (3) a Redis database (DB); or (4) a partition of a Redis DB.

In accordance with some embodiments, proxy 202 can be used to manage the data flow of node 200, to manage the data flow between node 200 and one or more other nodes in the same cluster, and to manage the data flow between node 200 and one or more nodes in another cluster.

Proxy 202 can also be used to perform client authentication in some embodiments. Any suitable one or more client authentication mechanisms can be used. For example, Simple Authentication and Security Layer (SASL) authentication, password authentication, source IP authentication, Amazon Web Service Security Group, and/or any other suitable authentication mechanisms can be used in some embodiments.

Figure 3:
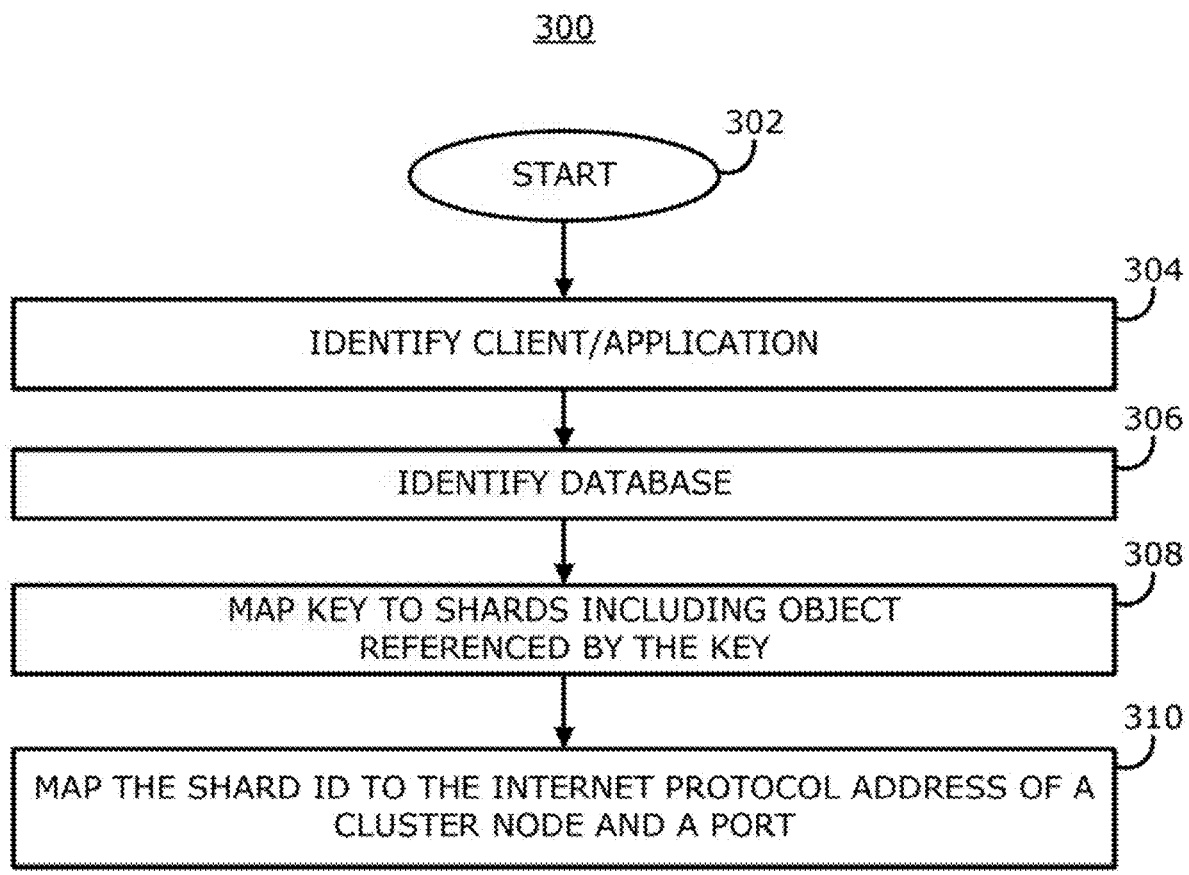
FIG. 3 is an example of a diagram of a process for mapping a key to a shard in accordance with some embodiments of the disclosed subject matter.

Proxy 202 can also be used to make routing decisions in accordance with some embodiments. Any suitable mechanism for making routing decisions can be used in some embodiments. For example, in some embodiments, routing decisions can be made using process 300 illustrated in FIG. 3. As shown, after beginning at 302, process 300 can determine the identity of a client and/or application that issued a request for data at 304. In some embodiments, this determination can be based on data from a client authentication process. Next, at 306, process 300 can determine which database (or bucket) the client is attempting to access by looking at the destination port of the TCP connection from which the request has been received. Then, at 308, process 300 can map a key received with the request to a user database shard (or bucket, partition, etc.). For example, such a mapping can be performed by hashing the key against the database shard space to get a shard ID of the key, and then by performing a short lookup operation to map the shard ID to a cluster and/or particular server that stores that shard. Any suitable hash function, such as SHA1, CRC16, etc., can be used in some embodiments. Any suitable shard space size, such as N=1024, 4096, etc., can be used in some embodiments. Then, at 310, process 300 can map the shard ID to an internet protocol (IP) address of a particular cluster node and to a particular port associated with the IP address.

Any suitable mechanism for identifying a server in a node can be used. For example, a server can be identified by a port number that is appended to an IP address, URL or other address corresponding to a node (e.g., NodeIP:ServerPort, NodeURL:ServerPort, etc.).

In accordance with some embodiments, proxy 202 can also be used to perform protocol translation. For example, in some embodiments, proxy 202 can perform a translation from a protocol used by clients/applications requesting data to a protocol used by servers 206. More particularly, for example, a client/application can request data using Memcached ASCII, Memcached binary, Redis old protocol, Redis unified protocol, and/or any other suitable protocol. Servers 206 can communicate using a Redis unified protocol modified to include extensions that allows the servers to support operations which are natively not supported by a Redis server (e.g., Memcached commands) without breaking the Redis unified protocol semantics. And proxy 202 can perform a translation between these protocols.

Proxy 202 can also perform load balancing in some embodiments to balance loads among a master server 206 or nodes 200 storing a master shard (which can respond to read and write requests for data objects) for a database (or bucket) partition or shard and one or more slave servers 206 or nodes 200 storing a slave shard (which can respond to read requests for data objects) for the same partition. For example, in some embodiments, the proxy for a partition that resides over multiple servers 206 (e.g., one master server and N (zero or more) slave servers), can redirect a request for a data object on that partition to a relevant least used server 206 based on shared usage statistics. As another example, in some embodiments, the proxy for a database shard that resides over multiple nodes 200 (e.g., one master shard and N (zero or more) slave shards), can redirect a request for a data object in that shard to a relevant least used node 200 based on shared usage statistics.

Figure 4:
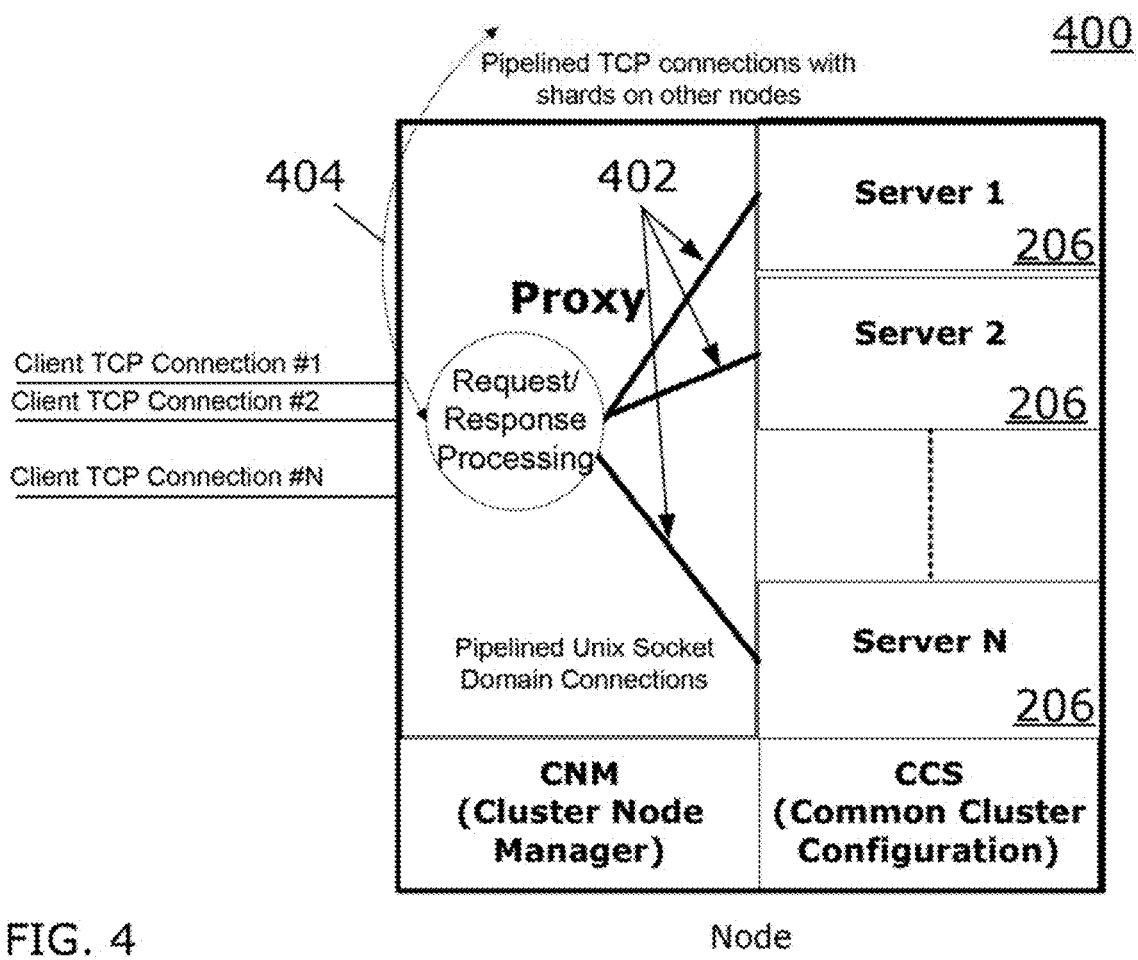
FIG. 4 is an example of a diagram of a connection between a data management controller and servers and other data management controllers in accordance with some embodiments of the disclosed subject matter.

In some embodiments, proxy 202 can redirect requests to and responses from a node on which a data object is stored when a request for that data object is received at the wrong node. In some embodiments, this redirection of responses can occur via dedicated connections 404 to one or more other proxies in other nodes as shown in FIG. 4.

To improve the performance of servers 206, proxy 202 can perform connection pooling in some embodiments. Any suitable technique for connection pooling can be used in some embodiments. For example, as shown in FIG. 4 in some embodiments, the proxy can maintain a number of connections 402 with each server 206 so that each addition or removal of a connection from a server will degrade its throughput and increase its latency. In some embodiments, connections 402 between a proxy 202 and servers 206 can be long-lived, persistent connections that reduce the overhead associated with connection setup and teardown between client and server.

To improve the performance of servers 206, proxy 202 can additionally or alternatively use Unix domain socket connections between the proxy and the servers in some embodiments. When the proxy and the server reside on the same physical/virtual machine, Unix domain socket connections can be used to eliminate the processing overhead associated with managing TCP connection between the proxy and the servers.

To improve the performance of servers 206, proxy 202 can additionally or alternatively perform request pipelining in some embodiments. Requests can be pipelined by the proxy by sending multiple requests to the same server before responses to the earlier of those requests are received from the server on requests that were previously sent on the same connection.

In some embodiments, the number of connections and the size of a pipeline between proxy 202 and each server 206 can additionally or alternatively be changed based on the average object size in the server. For example, in some embodiments, when the average object size in a server is less than 1 kB, the proxy may open fewer (or reduce the number of) persistent connections with the server and increase the pipeline size (i.e., the number of requests that can be sent to the server without waiting for its response). However, when the average file size is over 20 kB, for example, the proxy may increase the number of persistent connections with the server and reduce the pipeline size.

In some embodiments, the proxy can additionally or alternatively prioritize light processing requests over heavy processing requests coming from different client connections. Any suitable basis for selecting a processing request as being light or heavy can be used in some embodiments. For example, a Redis GET request can be considered to be a light request, where as a Redis ZRANGEBYSCORE request can be considered to be a heavy request.

In some embodiments, the proxy can additionally or alternatively send the same response to multiple requesters when a read request for a data object is received while another read request for the same data object has already been sent by the proxy to a server, but a corresponding response not received. In doing so, the proxy can queue one or more later requests until the response for the first request is received. The proxy can then send that response to the client that sent the first request and to all the clients with queued requests.

In some embodiments, the proxy can additionally or alternatively provide a cache for frequently requested data objects. In some embodiments, the frequently requested objects can be more frequently requested than the frequently requested objects similarly replicated across servers 206 as described below.

In accordance with some embodiments, cluster node manager (CNM) 204 can be used to perform node management functions and cluster management functions. For example, the cluster node manager can be used to monitor the status of each node, configure the node, control inter- and intra-node communications, elect nodes for aggregation and supervision functions, and provide a management interface for the cluster operation. Additionally, in some embodiments, CNM 204 can trigger a failover when a master node stored on the node being monitored fails. For example, if a portion of the master shard becomes corrupted or inaccessible (e.g., due to a failure of an operating system of a server storing a partition of the database included in the shard), CNM 204 can inform a node that has been elected as a cluster manager node that the master shard has failed, and the cluster manager node can re-designate a slave shard corresponding to the failed master shard as the new master shard.

In accordance with some embodiments, CNM 204 as a node manager can monitor for failures and/or degraded status in other nodes and in servers of its own node. Any suitable mechanism can be used for determining that another node or server has failed or become degraded in some embodiments. For example, in some embodiments, periodic messages can be sent out by each server in a node to the CNM of the node. The CNM can detect a failure when a message is missing. As another example, in some embodiments, each CNM can send out a periodic message to CNM(s) in one or more other nodes. The CNM(s) in the one or more other nodes can detect a failure when this message is missing. As yet another example, each server can send out a memory fragmentation status message to the CNM in the same node to alert the CNM if its performance has become degraded. Any suitable action can be taken in response to a failure or degraded status. For example, in some embodiments, a CNM can cause a server or another node to restart its software upon a failure being detected, to perform a de-fragmentation process upon a degraded status being detected, etc. In some embodiments, when the fragmentation ratio crosses a pre-defined threshold, the following can be performed: (1) another server on the same node or on a different node can be started; (2) the fragmented server can be backed-up; (3) all clients can be switched to the new server; (4) the fragmented server can be released; and (5) if the server stored at least a portion of a master shard of the database, the corresponding slave shard can be designated as the new master shard.

In some embodiments, CNM 204 as a node manager can receive, process, and monitor local configuration data, and/or monitor and collect node statistics, such as proxy statistics and server statistics.

In some embodiments, CNM 204 as a node manager can translate server statistics to other non-relational database statistics. For example, when a Memcached user asks to get his/her Memcached statistics for the user's server 206 that is based on a Redis server, the request can be forwarded to the relevant node that contains the user's server 206 that holds the user dataset, and the CNM in that node can process this request and translate the Redis statistics to Memcached statistics.

In some embodiments, CNM 204 as a node manager can provide statistics information to other components upon request.

In some embodiments, CNM 204 as a node manager can monitor the proxy and server(s) for performance alerts. For example, the CNM as a node manager can monitor cases where the throughput or the latency of the node or the server crosses pre-defined thresholds.

In some embodiments, CNM 204 as a node manager can control the load of the replication processes across the servers which reside on the same node, and control the multi-cluster replication operation of the server(s) within a node.

In some embodiments, CNM 204 as a cluster manager node can manage cluster configuration by communicating with another CNM designated as a cluster manager node for allocating and releasing resources.

In some embodiments, CNM 204 as a cluster manager node can rebalance the load of the nodes across a cluster.

In some embodiments, CNM 204 as a cluster manager node can make auto-sharding (scaling-out) decisions when a specific database (or Bucket) has to be split over more than one server due to load or memory constraints. This can be accomplished in any suitable manner. For example, the CNM can instruct a server to send one or more user data set partitions to a new server, and then the CNM can instruct the proxy to redirect requests destined to this partition(s) to the new server. Similarly, in some embodiments, CNM 204 as a cluster manager node can make auto-merging (scaling-in) decisions when a specific database (or Bucket) has to be merged from two or more servers to fewer servers due to reduced load or a reduction memory size. This can be accomplished in any suitable manner. For example, the CNM can instruct a server to send one or more user data set partitions to a target server that already manages a portion of the user data set, and then the CNM can instruction the proxy to redirect requests destined to this partition(s) to the target server.

In some embodiments, CNM 204 as a cluster manager node can update the cluster DNS servers with any configuration change of the database (or Bucket). These updates can be used to ensure that only one protocol hop will be used between the clients and the cluster nodes in some embodiments.

In some embodiments, CNM 204 as a cluster manager node can maintain a global configuration map that maps all users datasets (e.g., databases or Buckets) with their partitions to cluster nodes and servers. In some embodiments, when the CNM receives a request to create a user dataset, or receives a request to increase the size of a user dataset, the CNM can perform an admission control process which will look for additional resources over existing nodes of a cluster or alternatively will add a new node to the cluster. In some embodiments, when the CNM receives a request to delete a user dataset, or receives a request to decrease the size of a user data set, the CNM can perform an admission control process which will release the resources.

In some embodiments, CNM 204 as a cluster manager node can maintain a global rebalancing process in order to ensure that all resources of a cluster are spread equally across nodes.

In some embodiments, CNM 204 as a cluster manager node can forward monitoring requests from the system manager to the proper CNM and aggregate statistics from multiple servers that serve the same database (or Bucket). Information about levels of utilization of the servers 206 can be exchanged between cluster node managers (CNM) 204 in different nodes.

In some embodiments, CNM 204 as a cluster manager node, together with a different, relevant CNM designated as a Node Replication Controller, can perform cross-clusters replication operations.

In some embodiments, proxy 202 and CNM 204, each of which is a control process, can be combined to form a combined control process.

In some embodiments, server(s) 206 can be used to provide in-memory non-relational database functionality and any other suitable server process(es). In some embodiments, the server(s) can be based on the open-source Redis server with enhanced functionality. In some embodiments, the server(s) can represent one of the following options: (1) a Memcached Bucket; (2) a partition of a Memcached Bucket; (3) a Redis database (DB); or (4) a partition of a Redis DB.

In some embodiments, each node in a cluster can manage N servers (e.g., as shown in FIG. 1), and there can be any suitable number of servers managed by a given node, including zero, in some embodiments.

In accordance with some embodiments, CCS 208 is an internal cluster repository service (based on the Redis architecture). In some embodiments, this service can include a per-node and a per-cluster configuration, statistics, and alert information. All the nodes in a cluster can be synchronized with the per-cluster configuration. The proxy and CNM can be registered to the CCS to receive configuration change events which are relevant to their operations.

As shown in FIG. 1, in accordance with some embodiments, each cluster can include persistent storage 112 that can be used to backup data from the cluster. In accordance with some embodiments, persistent storage 112 can receive dataset snapshots from each server 206 in the cluster and write the snapshots to a persistent storage media of persistent storage 112, such as a hard disk drive (HDD), solid state drive (SSD), Amazon EC2 Elastic Buffer Storage (EBS), etc. In some embodiments, these snapshots can be written in a compressed format. In some embodiments, persistent storage 112 can be omitted.

In some embodiments, the cluster architecture described herein can be provided as a service. A user of this service can be registered through the service manager (SM), which communicates with a CNM designated as a cluster manager node to allocate user resources in the cluster. In some embodiments, the SM may allocate resources across multiple clusters.

In some embodiments, a user resource can be a Memcached Bucket, a Redis database (DB), or any other suitable non-relational database. Each Bucket/DB can be hosted over one or more servers 206, depending on the transaction load imposed and the memory size of its dataset. In some embodiments, each Bucket/DB can be composed of multiple partitions (e.g., 1024, 4096 or any other suitable number). In some embodiments, keys can be equally spread over the different partitions by applying a hash function technique.

In some embodiments, a partition in a cluster can be hosted by one master server 206, and by zero or more slave servers 206. Master servers can serve both read and write requests, and slave servers can only serve read requests, in some embodiments. Additionally or alternatively, in some embodiments, a node can store one or more shards of the database, which can include one or more database partitions. Each shard can be either a master shard or a slave shard such that a master shards can serve both read and write requests, and slave shards can only serve read requests. In some embodiments, a single node can store multiple shards in any suitable combination of master and slave shards.

When a Bucket/DB is created, the user can be provided with a list of DNS addresses to be used for accessing its Bucket/DB in some embodiments. The user then needs to configure its application servers to use these addresses. This list can include DNS addresses for both master and slave servers 206 that hold the Bucket/DB. Multiple DNS addresses may point to the same server 206. Additionally of alternatively, this list can include DNS addresses for both nodes 110 storing master shards and slave shards of the Bucket/DB. Multiple DNS addresses may point to the same node 110.

Application requests may be sent directly to the node where the key is hosted, or may be redirected to that node by another node (e.g., through the proxy). For example, as described below in connection with FIGS. 10A and 10B.

Figure 5:
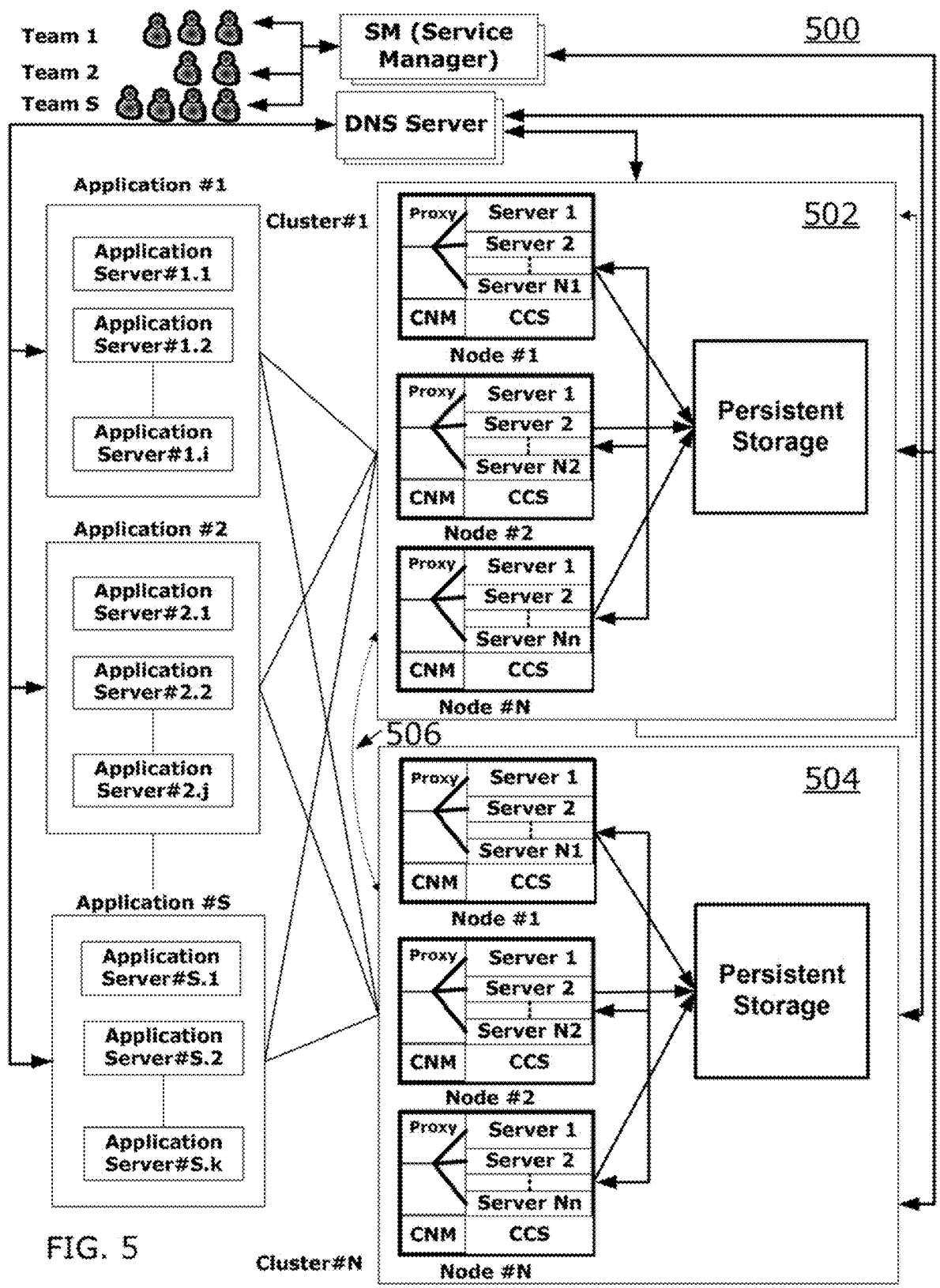
FIG. 5 is an example of a diagram of a multi-cluster, multi-region architecture in accordance with some embodiments of the disclosed subject matter.

In some embodiments, the mechanisms described herein can be implemented on a multi-cluster architecture, where the multi-cluster architecture can be implemented over: a single zone belonging to a region of a single cloud vendor; a multi-zone belonging to a region of a single cloud vendor; a multi-region of a single cloud vendor; and a multi-cloud, as illustrated in FIG. 5. As shown, each cluster 502, 504 in this architecture can reside in a different geographical region of a cloud or in a different zone where each region includes multiple zones (like the Amazon Elastic Cloud (EC2) architecture) or in different clouds (like the Amazon cloud and the RackSpace cloud). In some embodiments, when a multi-cluster configuration is enabled, data can be synchronized across dispersed geographical regions via a dedicated channel 506 shown in FIG. 5.

Figure 6:
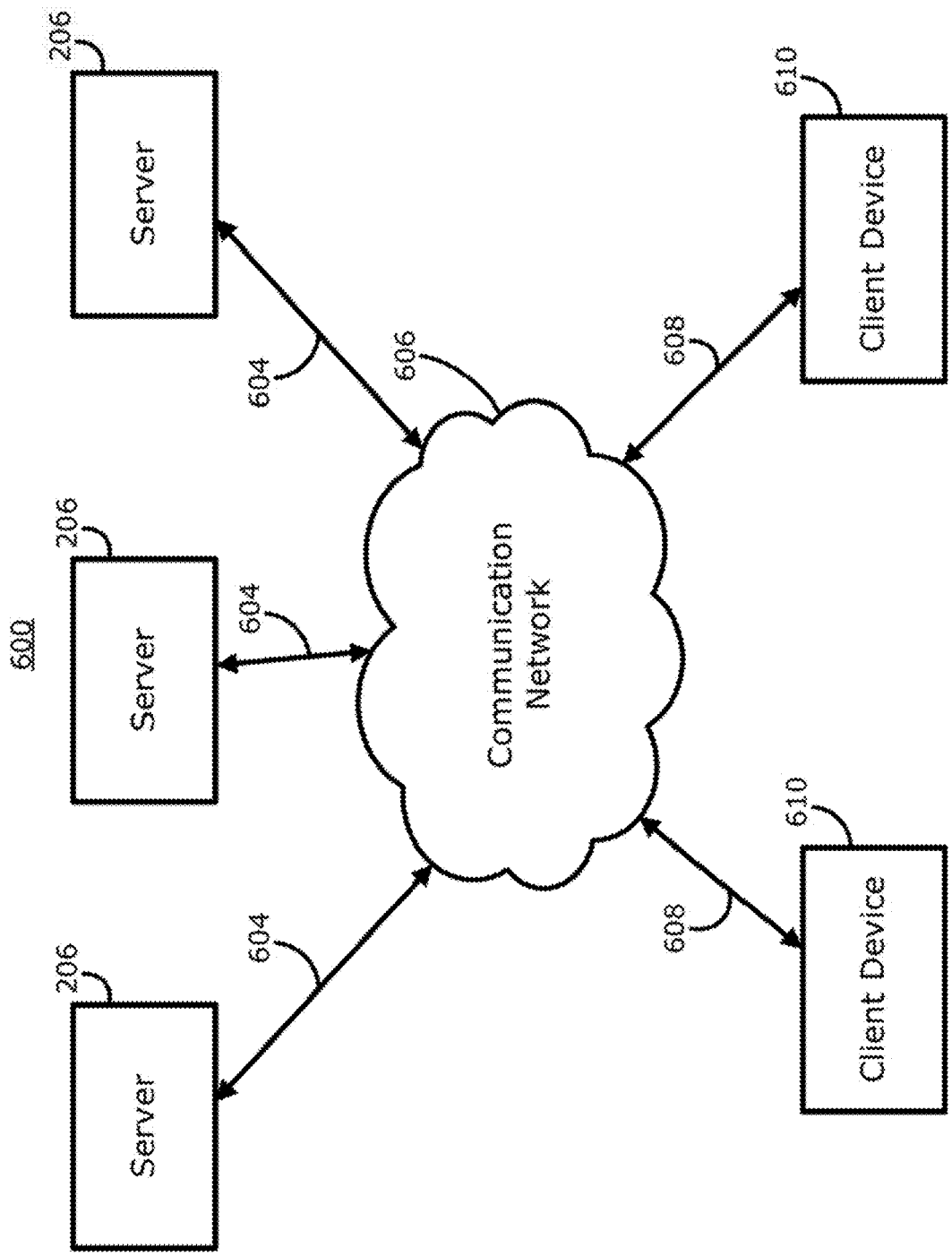
FIG. 6 is an example of a generalized schematic diagram of a system on which the mechanisms for providing distributed database access during a network split as described herein can be implemented in accordance with some embodiments.

FIG. 6 shows an example 600 of a generalized schematic diagram of a system on which the mechanisms for providing distributed database access during a network split as described herein can be implemented in accordance with some embodiments. As illustrated, system 600 can include one or more client devices 610. Client devices 610 can be local to each other or remote from each other. Client devices 610 can be connected by one or more communications links 608 to a communication network 606 that can be linked to one or more servers 206 via communications links 604.

System 600 can include servers 206. Server 206 can be any suitable server or servers for providing access to the mechanisms described herein for providing distributed database access during a network split, such as a hardware processor, a computer, a data processing device, or any suitable combination of such devices. For example, the mechanisms for providing distributed database access during a network split can be distributed into multiple backend components and multiple frontend components and/or user interfaces. In a more particular example, backend components, such as mechanisms for receiving requests to perform an operation in a database from one or more client devices 610, for performing a database operation, for returning information that results from the database operation to the requesting client device 610, for administering the database across various nodes, etc., can be performed on one or more servers 206. In another particular example, frontend components, such as mechanisms for presenting a user interface, for initiating requests to perform a database operation, for executing an application, etc., can be performed on one or more client devices 610.

In some embodiments, each of client devices 610 and servers 206 can be any of a general purpose device such as a computer or a special purpose device such as a client, a server, etc. Any of these general or special purpose devices can include any suitable components such as a hardware processor (which can be a microprocessor, a digital signal processor, a controller, etc.), memory, communication interfaces, display controllers, input devices, etc. For example, client device 610 can be implemented as a server, a personal computer, a laptop computer, any other suitable computing device, or any suitable combination thereof. As a more particular example, client device 610 can be implemented as an application server that executes application 104 as described above in connection with FIG. 1.

Communications network 606 can be any suitable computer network or combination of such networks including the Internet, an intranet, a wide-area network (WAN), a local-area network (LAN), a wireless network, a Wi-Fi network, a digital subscriber line (DSL) network, a frame relay network, an asynchronous transfer mode (ATM) network, a virtual private network (VPN), an intranet, etc. Each of communications links 604 and 608 can be any communications links suitable for communicating data among client devices 610 and servers 206, such as network links, wireless links, hard-wired links, dial-up links, any other suitable communications links, or any suitable combination of such links. Note that, in some embodiments, different servers 206 can be used to perform one or more different roles in accordance with the mechanisms described herein for providing distributed database access during a network split. For example, as described below in connection with FIGS. 9, 10A and 10B, system 600 can include one or more servers 206 that records configuration information of nodes that make up a cluster or clusters that store parts of a distributed database (e.g., one or more servers that maintains CCS 208), one or more servers 206 that receives requests to perform operations to the database and determines one or more nodes to which the request is to be forwarded (e.g., one or more servers that executes the processes described herein associated with proxy 202), and/or any other suitable servers for performing any suitable functions of the mechanisms described herein and/or any other suitable functions.

In some embodiments, functions performed by each node 110 can be executed by one or more of servers 206 of that node or another separate server 206 (or other suitable computing device) in communication with servers 206 of that node. For example, although proxy 202 is described as being in communication with servers 206, proxy 202 can itself be executed by one or more of servers 206.

Figure 7:
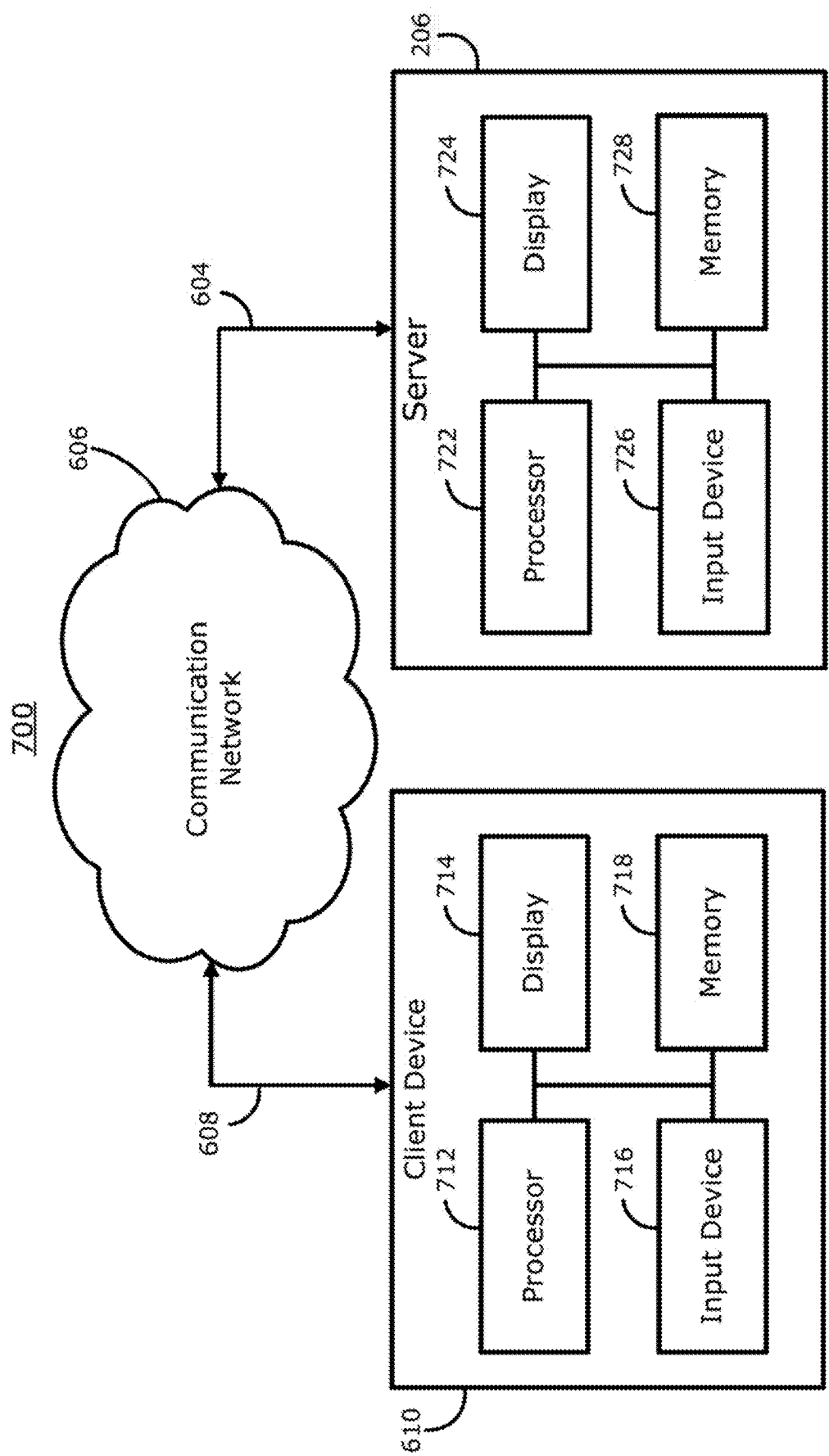
FIG. 7 is an example of a diagram of hardware that can be used to implement one or more of the client devices and servers depicted in FIG. 6 in accordance with some embodiments of the disclosed subject matter.

FIG. 7 illustrates an example 700 of hardware that can be used to implement one or more of client devices 610 and servers 206 depicted in FIG. 6 in accordance with some embodiments of the disclosed subject matter. Referring to FIG. 7, client device 610 can include a hardware processor 712, a display 714, an input device 716, and memory 718, which can be interconnected. In some embodiments, memory 718 can include a storage device (such as a non-transitory computer-readable medium) for storing a computer program for controlling hardware processor 712. In some embodiments, memory 718 can include storage and/or working memory.

Hardware processor 712 can use the computer program to interact with the mechanisms described herein by executing an application that initiates requests to perform actions in the database, executing an application that causes content based on information received from the database to be presented, and/or to perform any other suitable functions. In some embodiments, hardware processor 712 can send and receive data through communications link 608 or any other communication links using, for example, a transmitter, a receiver, a transmitter/receiver, a transceiver, or any other suitable communication device. Display 714 can include a touchscreen, a flat panel display, a cathode ray tube display, a projector, a speaker or speakers, and/or any other suitable display and/or presentation devices. Input device 716 can be a computer keyboard, a computer mouse, a touchpad, a voice recognition circuit, a touchscreen, and/or any other suitable input device.

Server 206 can include a hardware processor 722, a display 724, an input device 726, and memory 728, which can be interconnected. In some embodiments, memory 728 can include a storage device for storing data received through communications link 604 or through other links. In some embodiments, memory 728 can include storage and/or system memory. The storage device can further include a server program for controlling hardware processor 722. In some embodiments, memory 728 can include, among other things (e.g., as described below in connection with FIG. 8) one or more portions of a database (sometimes referred to herein as a "shard" or "database shard") which can include the results of requests from client devices 610 to perform operations in the database. Additionally, in some embodiments, hardware processor 722 can receive requests to perform an operation (or multiple operations) on the portion of the database stored in memory 728 (and/or stored by another server 206) from client devices 610 and/or applications 104, and can perform any suitable actions in response to receiving the request to perform an operation, and/or perform any other suitable actions. In some embodiments, the server program can cause hardware processor 722 to, for example, execute at least a portion of processes 900 as described below in connection with FIG. 9 and/or process 1000 as described below in connection with FIGS. 10A and 10B.

Hardware processor 722 can use the server program to communicate with client devices 610 and other servers 206, as well as provide access to and/or copies of the mechanisms described herein and information stored in the distributed and replicated database of which a portion may be stored by server 206 that includes hardware processor 722. It should also be noted that data received through communications link 604 or any other communications links can be received from any suitable source. In some embodiments, hardware processor 722 can send and receive data through communications link 604 or any other communication links using, for example, a transmitter, a receiver, a transmitter/receiver, a transceiver, or any other suitable communication device. In some embodiments, hardware processor 722 can receive commands and/or values transmitted by one or more client devices 610 and/or one or more users of server 206, such as a user that makes changes to adjust settings associated with the mechanisms described herein for sharing links to private contextualized conversations on third party platforms. Display 724 can include a touchscreen, a flat panel display, a cathode ray tube display, a projector, a speaker or speakers, and/or any other suitable display and/or presentation devices. Input device 726 can be a computer keyboard, a computer mouse, a touchpad, a voice recognition circuit, a touchscreen, and/or any other suitable input device.

In some embodiments, one or more virtualization techniques can be used such that a single physical server 206 can run copies of one or more operating systems, such that the single physical server can function as multiple servers that can each act independently to execute one or more of the processes described herein and/or any other suitable processes. For example, a single server can execute a first copy of an operating system that uses a hardware processor of the server at least a portion of the time to provide access to one or more shards of a distributed database that is stored in the working memory and/or storage of the server in accordance with the mechanisms described herein. In such an example, the same server can execute a second copy of the operating system that can use the same hardware processor of the server at least a portion of the time to provide access to an application that is unrelated to the mechanisms described herein. Additionally or alternatively, the second copy of the operating system can provide access to one or more shards of the same distributed database (which may be include one or more of the same shards that are accessible via the first copy of the operating system, or different shards) that is stored in the working memory and/or storage of the server in accordance with the mechanisms described herein.

Figure 8:
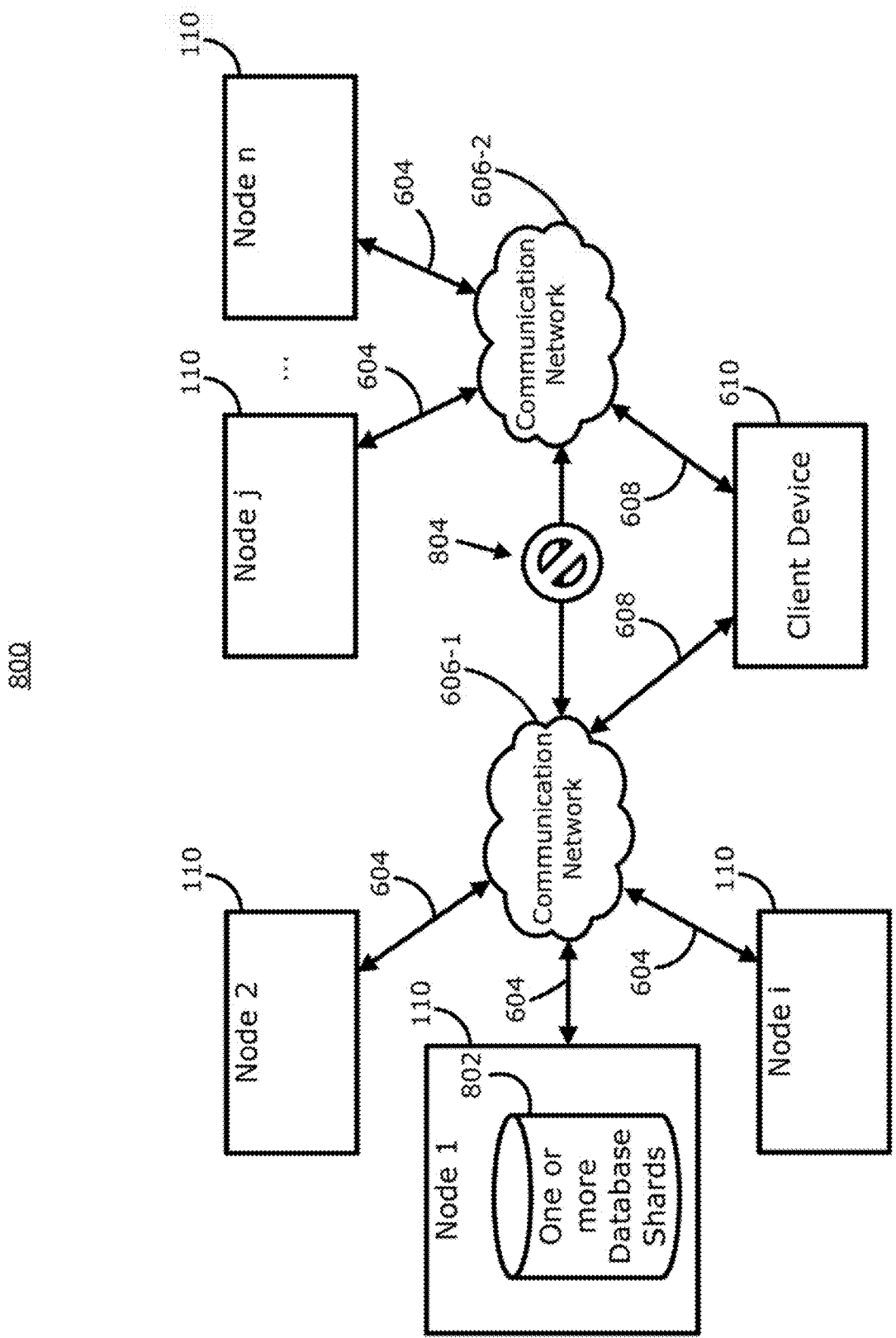
FIG. 8 is an example of a diagram of several nodes of a distributed database in which a network split has occurred in accordance with some embodiments of the disclosed subject matter.

FIG. 8 shows an example 800 of several nodes of a distributed database in which a network split has occurred in accordance with some embodiments of the disclosed subject matter. In some embodiments, a distributed database can include any suitable number of nodes 200 that each host one or more portions (or shards) 802 of a database. For example, information from a single database can be divided into any suitable number of partitions using any suitable technique or combination of techniques. In such an example, a shard of a database can include one or more of the partitions, which can be grouped to form a shard based on any suitable factor or combination of factors. In some embodiments, nodes 110 that make up a distributed database can make up a database cluster (e.g., which can include nodes from a cluster 102 as described above in connection with FIG. 1 and/or nodes from multiple clusters as described above in connection with FIG. 5) which client device 610 can interact with as though it is a single system rather than a group of individual nodes or clusters. The nodes that make up the cluster may or may not be located in physical proximity. For example, in some embodiments, each node 110 in the database cluster can include one or more physical servers and/or virtual servers being executed by physical servers in the same physical location, such as a datacenter. In such an example, nodes 110 can communicate with one another over a local area network (LAN) (e.g., as described above in connection with FIG. 1). As another example, in some embodiments, one group of nodes 110 in the cluster can be one or more physical servers and/or virtual servers being executed by physical servers in a first location (e.g., a datacenter), and another group of nodes 110 can be one or more physical servers and/or virtual servers being executed by physical servers in a second location (e.g., an office building). In such an example, nodes 110 that are located in the same physical location can communicate with one another over a LAN, and nodes 110 that are not located in the same physical location can communicate with one another over non-local communication links, such as the Internet, a dedicated line, a frame relay network, and/or any other suitable wide area network connection. In some embodiments, nodes 110 of the database cluster can be located in any suitable number of locations and can be connected to each other using any suitable technique or combination of techniques.

In some embodiments, a distributed database can be replicated such that nodes 110 store multiple copies of the same shard with one of the copies being designated as the master copy and any other copy or copies of the same shard being designated as slave copies of the shard. In some embodiments, as described above in connection with FIG. 2, when a request is received at the database cluster to perform an operation that involves writing a value to an object in the replicated database, the operation can be carried out in the master shard and replicated to the slave shard. By contrast, when a request is received at the database cluster to perform an operation that involves reading a value from an object in the replicated database, the operation can be carried out in either the master shard or the slave shard depending on various factors, such as whether the slave shard includes up-to-date information, based on load balancing, etc. As described above in connection with FIG. 2 and below in connection with FIGS. 10A and 10B, when a request to perform an operation is received at a node in the database cluster, that request can be routed to an appropriate node by proxy 202 of a node hosting the proxy that received the request.

In some embodiments, a network split (represented by symbol 804) can occur if the node hosting the proxy that receives the request is not able to communicate with each other node that make up the replicated database. In such a situation, the node hosting the proxy that received the request may be capable of routing the request to only the node storing the master shard, only the node storing a slave shard, both nodes, or neither node. As described in more detail below in connection with FIGS. 9, 10A and 10B, whether the request is routed to the node storing the master shard, the node storing the slave node, or inhibited from being processed can be determined based on whether the node hosting the proxy that received the request and nodes with which it can communicate form a majority of the nodes that make up the replicated database. If the node hosting the proxy that received the request and nodes with which it can communicate form a majority of the nodes that make up the database (i.e., it is on the majority side of the network split), then the proxy can route write requests to the node storing the master shard that is referenced by the request, and can route read requests to either the node storing the master shard or the slave shard including the object referenced by the request. However, if the node hosting the proxy that received the request and nodes with which it can communicate do not form a majority of the nodes that make up the database (i.e., it is on a minority side of the network split), then the proxy can inhibit write requests from being fulfilled and can, in some embodiments, route read requests to either the node storing the master shard including the object referenced by the request or the node storing the slave shard including the object referenced by the request (e.g., if both nodes are on the minority side of the split with the node hosting the proxy that received the request). Alternatively, in some implementations, if the node hosting the proxy that received the request is on a minority side of the network split, then the proxy can inhibit read and write requests from being forwarded or acted upon for the duration of the network split.

Accordingly, in such embodiments, a quorum can be established so long as the node hosting the proxy that received the request and nodes with which it can communicate form a majority of the nodes that make up the database, rather than requiring, for example, that more than half of the shards storing the information are all in communication with each other in order to perform any operation, as is typically the case in distributed databases. Consequently, rather than the replicated distributed database containing at least three copies of the database, a replicated distributed database as described in connection with the mechanisms described herein can include as few as two copies of the database so long as the database cluster includes an odd number of nodes.

In some embodiments, in the event that the database would normally be replicated across an even number of nodes, the database cluster can include a quorum node such that the number of nodes in the database cluster is an odd number. Such a quorum node may or may not store any shards of the database. For example, the quorum node can be a node that stores no data, but otherwise behaves similarly to other nodes in the database cluster (e.g., a "dummy node"). As another example, the quorum node can be similar to other nodes, and a portion of memory from another node in the database cluster that would have been allocated to the replicated distributed database can be allocated to another database, and a shard of the replicated database that was to have been stored by that node can be stored instead by the quorum node. In some embodiments, as described below in connection with FIG. 9, the quorum node can send messages to other nodes in the database cluster so that each node can determine, in the event of a network split, whether it is on the majority side of the network split or a minority side of the network split. Note that although a node incorporated in the replicated database for the purposes of maintaining an odd number of nodes is sometimes described herein as a quorum node, it is not necessary that the node is designated in any special way as being a quorum node. Rather, the term quorum node is merely used for convenience.

Figure 9:
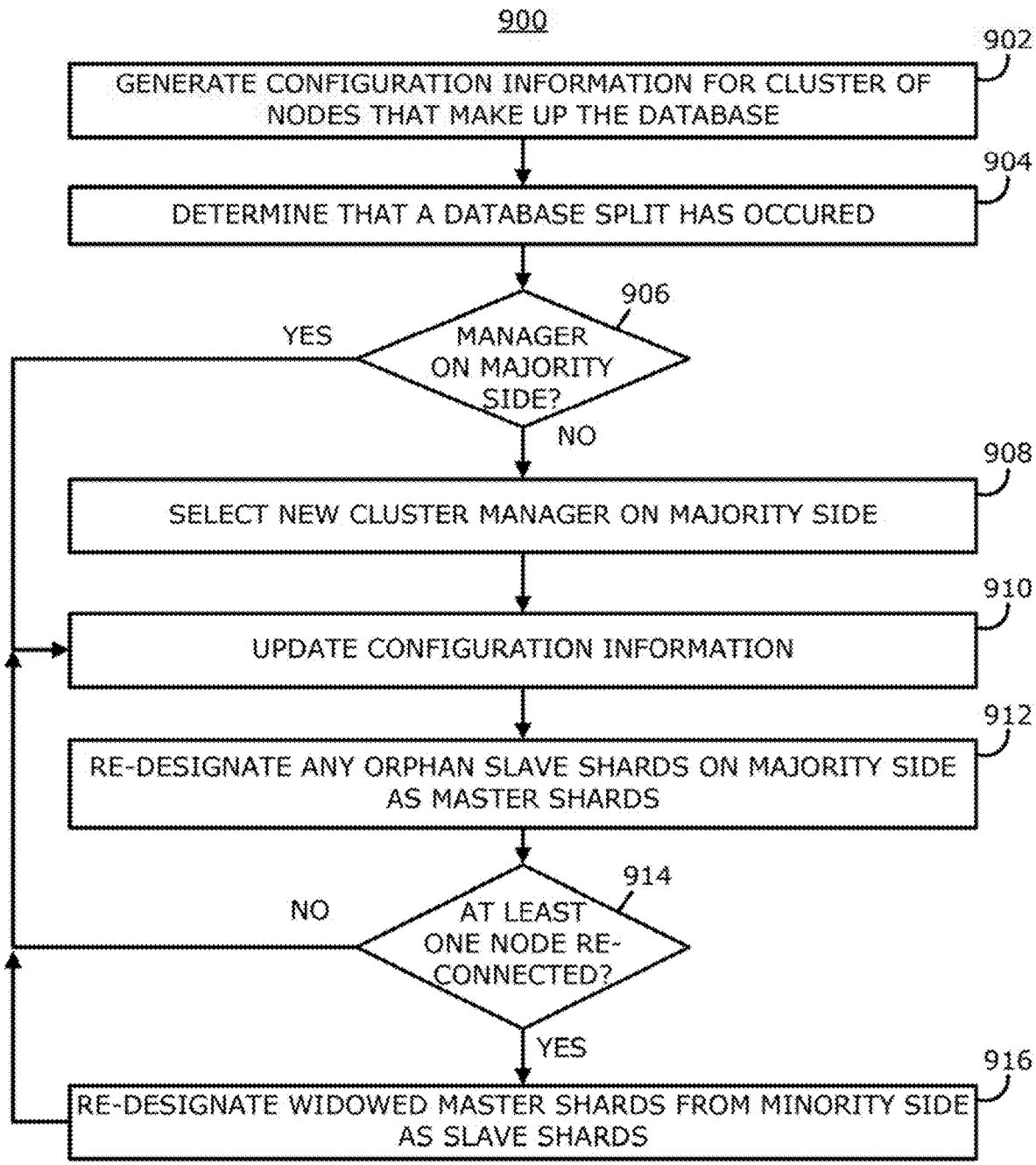
FIG. 9 is an example of a diagram of a process for managing configuration of a replicated distributed database in accordance with some embodiments of the disclosed subject matter.

FIG. 9 shows an example 900 of a process for managing configuration of a replicated distributed database in accordance with some embodiments of the disclosed subject matter. In some embodiments, one or more portions of process 900 can be executed by any suitable node 110 and/or any other suitable computing device. For example, nodes 110 that make up the replicated distributed database can elect a node to act as a cluster manager node which can designate shards as either a master shard or a slave shard, and maintain CCS 208 for the replicated distributed database such that each node can access CCS 208 to determine where a request should be routed based on the key associated with the request.

As shown in FIG. 9, at 902, process 900 can generate configuration information for the cluster of nodes that make up the replicated distributed database. As described above in connection with FIG. 2, a CNM 204 of a node that has been elected as the cluster manager node can update CCS 208 based on periodic messages received from CNMs 204 of other nodes. Such messages can include, for example, the status of the other node, which shards are stored by that node, whether the shard is a master or a slave shard, the status of any server(s) storing the shards, etc. In some embodiments, updates to CCS 208 can be shared across each node in the database cluster, such that each node 110 that includes CCS 208 can route requests that reference an object in a shard stored in another node to the appropriate node based on whether the request is a request to read from the object or write to the object.

Additionally, in some embodiments, CNM 204 of each other node other than the node elected as the cluster manager node can also periodically receive such messages. In such embodiments, CNM 204 of a particular node can detect that a node failure and/or a network split has occurred based on the absence of such messages from one or more other nodes.

In some embodiments, CNM 204 of the node elected as the cluster manager node can designate which shards are master shards and which shards are slave shards. For example, when a node 110 (and/or a server 206 of that node) storing a master shard fails, CNM 204 of that node can detect the failure of the master shard and communicate the failure to CNM 204 of the cluster manager node. In such embodiments, CNM 204 of the cluster manager node can re-designate the slave node (or one of the slave nodes) corresponding to the failed master node as the new master node. Additionally, in some embodiments, CNM 204 of the cluster manager node can re-designate the shard that was formerly the master shard as the slave shard and/or can cause the new master shard to be replicated on a new node and/or new server. Any such changes to the status of shards as master or slave shards, and/or the replication of new slave shards can be updated in CCS 208 such that each other node can correctly route requests referencing objects in those shards.

At 904, process 900 can determine that a split has occurred in the database such that each node 110 is no longer in communication with all other nodes. A database split (or network split) can occur for various reasons such as the failure of a switch that connects two or more nodes of the cluster, one or more nodes of the cluster fails, one or more physical servers of the cluster fails, one or more dedicated lines connecting various nodes of the cluster fails, etc. As described above, CNM 204 of any node can determine that a database split has occurred based on the absence of expected messages from other nodes in the cluster.

At 906, process 900 can determine whether the node elected as the cluster manager node is on the majority side of the network split. In some embodiments, the majority side of the split can be a side of the split that includes more than half of the nodes in the cluster (note that with an odd number of nodes, there can never be exactly half of the nodes on one side of a network split). As described above, the cluster has an odd number of nodes (which may include a quorum node) such that a node can never be in communication with exactly half of the nodes in the database cluster. Note that in the event of a network split there can be only one majority side, but there can potentially be multiple minority sides in the event that there are multiple simultaneous network splits.

In some embodiments, CNM 204 of each node can determine whether a message has been received from a CNM of each other node in the database cluster within a particular period of time. In such embodiments, based on the nodes from which messages have been received, CNM 204 can determine whether it is on the majority side based on whether messages have been received from at least (N-1)/2 other nodes, where N is the number of nodes that normally make up the database cluster (e.g., determined based on CCS 208). Similarly, CNM 204 can determine whether a message has been received from the cluster manager node based on known information about the cluster manager node (e.g., as identified in CCS 208).

If process 900 determines that the node elected as the cluster manager node is not on the majority side of the network split ("NO" at 906), process 900 can proceed to 908, and the nodes on the majority side of the split can elect a new node as the cluster manager node (e.g., as described above in connection with FIG. 2).

Otherwise, if process 900 determines that the node elected as the cluster manager node is on the majority side of the network split ("YES" at 906), process 900 can proceed to 910. At 910, the CNM of the cluster manager node can update CCS 208 of the nodes on the majority side of the split to reflect any updates to the database. In some embodiments, CCS 208 can be updated with any suitable information, which can, for example, indicate the presence of the network split and/or any other suitable information such as which nodes are not in communication with the majority side of the network split. Additionally, in some embodiments, the cluster manager node (or any other suitable node and/or process hosted by a node) can determine whether any proxies that direct requests referencing objects stored on the majority side of the network split are hosted by a node that is not on the majority side of the network split (e.g., proxies on the minority side that would otherwise route requests to nodes on the majority side). If any such proxies exist, the cluster manager node (or any other suitable node and/or process hosted by a node) can perform a proxy failover operation to re-designate proxies that are currently located on the majority side of the network split as a new proxy to be used to access the data that was formerly accessed through a proxy is hosted by a node that is not currently located on the majority side of the network split.

At 912, process 900 can re-designate any orphaned slave shards on the majority side of the split as a master shard. As used herein, an orphaned slave shard can be a slave shard that is stored by a node on the majority side of the split with no corresponding master shard on the majority side of the split. In some embodiments, CNM 204 of the cluster manager node can use any suitable technique or combination of techniques to determine that a slave shard is to be re-designated as a master shard. For example, CNM 204 of the cluster manager node can determine which shards are present on the majority side of the network split (e.g., based on messages received from the other nodes on the majority side of the network split) and whether each shard is a master shard or a slave shard. In a more particular example, CNM 204 of the cluster manager node can use CCS 208 from before the network split occurred and the presence or absence of particular nodes to determine which shards are stored on the majority side of the split and whether those shards are master shards or slave shards. In some embodiments, CNM 204 of the cluster manager node can update CCS 208 such that the orphaned slave shard is now designated as the master shard. Additionally, in some embodiments, CNM 204 of the cluster manager node can designate the master shard that is stored by a node that is not on the majority side as a slave node in CCS 208, although this change cannot be communicated to nodes on the minority side of the split.

At 914, process 900 can determine whether the database has been reconnected such that at least one node that was previously not on the majority side of the split is now in communication with nodes that were on the majority side of the network split. For example, if a network split occurs such that nodes 1-3 of a five node database are on the majority side of the split, and nodes 4 and 5 are not on the majority side (e.g., nodes 4 and 5 are not in communication with nodes 1-3 and may not have been in communication with each other), process 900 can determine at 914 whether communication has been reestablished to either node 4 or node 5 (or both). In some embodiments, process 900 can use any suitable technique or combination of techniques to determine if a node has been reconnected to the nodes of the majority side of the split.

If process 900 determines that at least one node has not been reconnected to the nodes that were on the majority side of the network split ("NO" at 914), process 900 can return to 910 and continue to update the configuration information for the majority side of the database cluster. Otherwise, if process 900 determines that at least one node has been reconnected to the nodes that were on the majority side of the network split ("YES" at 914), process 900 can proceed to 916.

At 916, process 900 can re-designate any widowed master shards that were on the minority side of the split as a slave shard. As used herein, a widowed master shard can be a master shard that is stored by a node on a minority side of the split when the corresponding slave shard was on the majority side of the split. As described above in connection with 912, CCS 208 can be updated to reflect the change in the status of the widowed master shard when CNM 204 of the cluster manager node designates the orphaned shard as the new master shard. In some embodiments, at 916, CNM 204 of the cluster manager node can cause CCS 208 of any reconnected nodes to be updated to reflect any changes made at 910 and/or 912 while the newly reconnected node was not in communication with the majority side of the split. In such embodiments, CCS 208 of any reconnected nodes can then be used by the reconnected node to update the status of any widowed master shards stored by that node and/or to cause that shard to be updated to reflect any changes made in the new master shard (i.e., the orphaned slave shard). In some embodiments, process 900 can return to 902 and/or 910 upon updating CCS 208 of a reconnected node. In some embodiments, after re-designating the widowed master shards as slave shards, process 900 can return to 910 and continue to update the configuration information. In some embodiments, this can continue until all nodes have been reconnected to the majority side of the network split, upon which process 900 can, for example, return to 902. In some embodiments, proxies that were located on the minority side of the network split for which failovers were performed can be re-designated as proxies for at least a portion of the database.

Figure 10A:
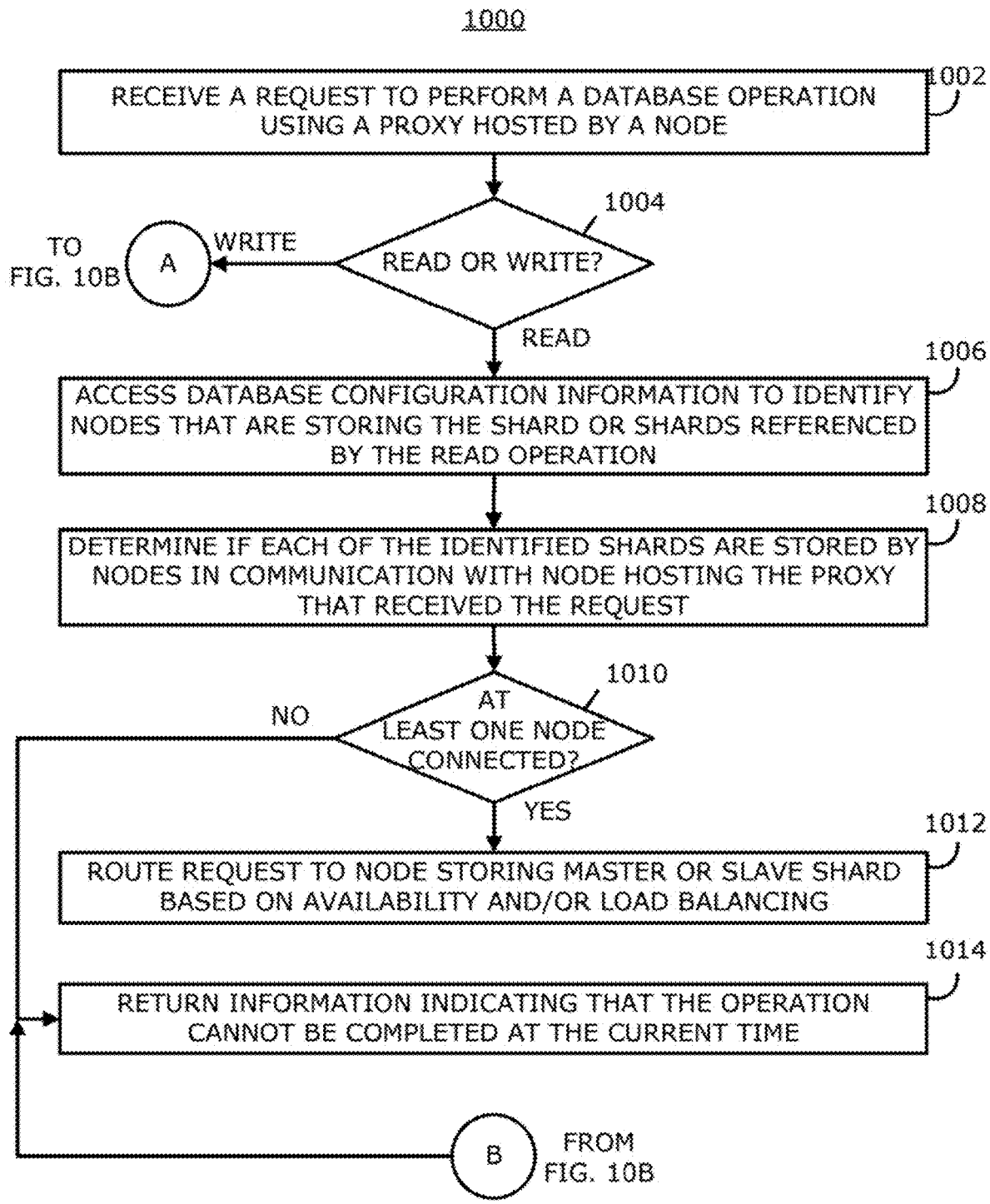
FIGS. 10A and 10B show an example of a diagram of a process for responding to a request to perform an operation during a network split in accordance with some embodiments of the disclosed subject matter.
Figure 10B:
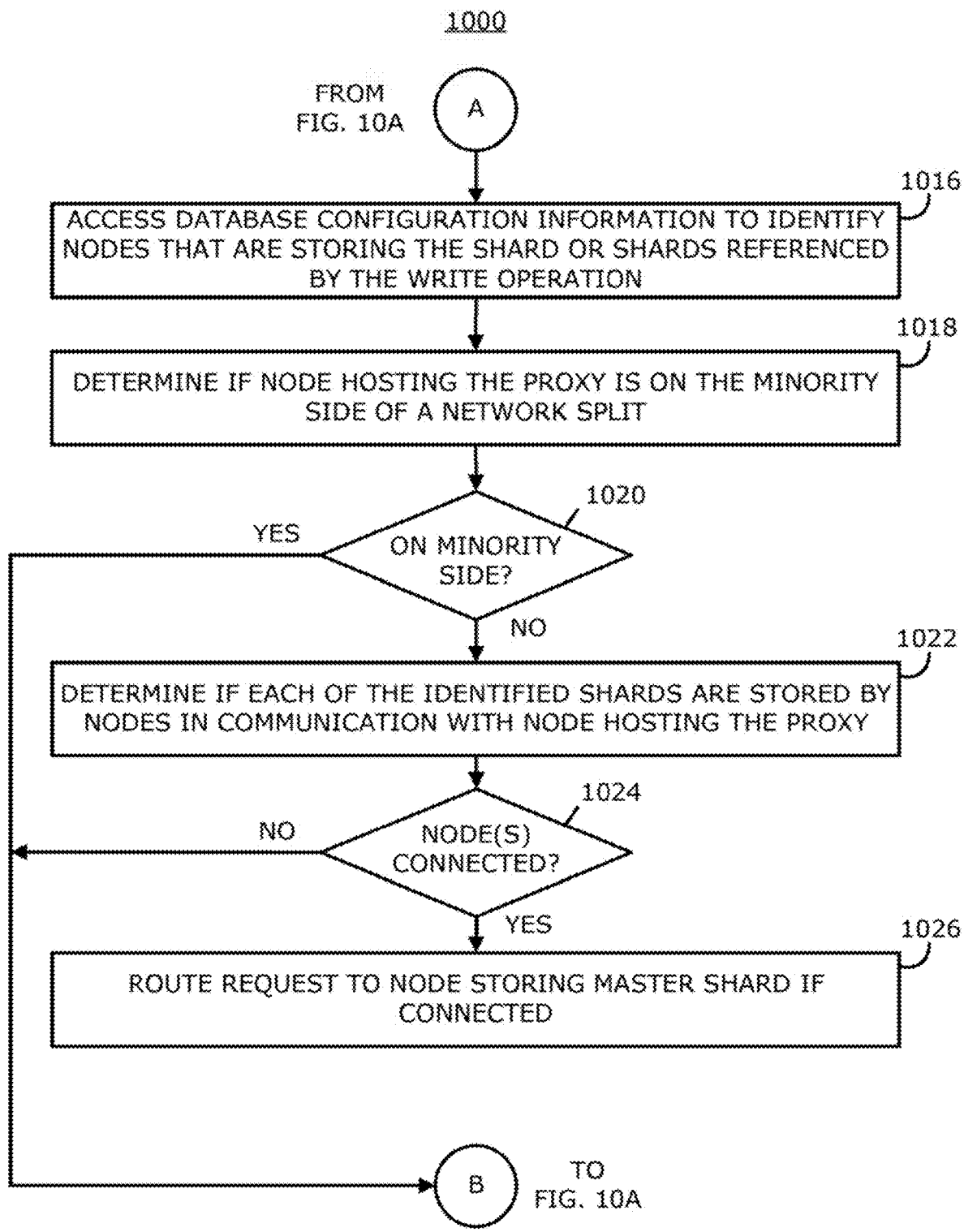

FIGS. 10A and 10B show an example 1000 of a process for responding to a request to perform an operation during a network split in accordance with some embodiments of the disclosed subject matter. In some embodiments, one or more portions of process 1000 can be performed by any suitable node of a replicated database. Additionally, in some embodiments, one or more portions of process 1000 can be performed by any suitable component of a node 110, such as proxy 202.

At 1002, process 1000 can receive a request to perform a database operation using a proxy hosted by a node. In some embodiments, the request to perform a database operation can be received from any suitable application 104 and/or client device 610. Additionally, the request can include any requested operation or operations to be performed in connection with any suitable object or objects stored in the replicated distributed database. For example, the operation can be a GET or SET operation that specifies an operation to be performed in connection with a single object via a single key. As another example, the operation can be a Multi-GET (MGET) or Multi-Set (MSET) operation that specifies operations to be performed in connection with a multiple objects via multiple keys. Other examples of operations are discussed above in connection with FIG. 2.

At 1004, process 1000 can determine whether the operation requested at 1002 is an operation that involves reading information from the database, or writing information to the database. In some embodiments, process 1000 can use any suitable technique or combination of techniques to determine whether the operation is a read operation or a write operation. Additionally or alternatively, rather than making a determination of whether the operation is a read or a write operation, process 1000 can determine which operation is being requested (e.g., GET, SET, MGET, MSET, etc.), and based on the operation being requested make a determination of whether to proceed to 1006 or 1016 as described below. For example, process 1000 can determine that if the operation is a GET operation, process 1000 is to proceed to 1006, rather than determining that the GET operation is a read operation and thus determining that process 1000 is to proceed to 1006. In some embodiments, prior to determining whether the operation is a read or write operation at 1004, process 1000 can determine whether the node hosting the proxy that received the request at 1002 is on the minority side of a network split or the majority side of a network split (e.g., as described below in connection with 1020 of FIG. 10B). In such embodiments, if process 1000 determines that the node hosting the proxy that received the request at 1002 is on the minority side of the network split, process 1000 can inhibit a write request from being forwarded and/or acted upon.

If process 1000 determines that the operation is an operation that involves reading information from the database ("READ" at 1004), process 1000 can proceed to 1006. At 1006, process 1000 can access database configuration information to identify one or more modes that are storing a shard or shards referenced by the read operation. For example, proxy 202 can access CCS 208 to determine which node or nodes store shards that include one or more objects referenced by one or more keys specified in the request received at 1002. As another example, if the request received at 1002 is a request to perform a GET operation to a particular object, process 1000 can determine which shards include the object on which the GET operation is to be performed (i.e., process 1000 can determine which master shard includes the object and which slave shard includes the object). As another example, if the request received at 1002 is a request to perform an MSET operation to a group of objects, process 1000 can determine all of the shards that include the objects on which the MSET operation is to be performed (i.e., process 1000 can determine which master shard includes each object and which slave shard includes each object referenced by the MGET operation).

At 1008, process 1000 can determine which of the shards identified at 1006 (e.g., shards that include an object referenced by the request received at 1002) are stored by a node in communication with the node hosting the proxy that received the request at 1002. In some embodiments, process 1000 can use any suitable technique or combination of techniques to determine whether a particular node is in communication with the node hosting the proxy that received the request at 1002. For example, as described above in connection with FIGS. 2 and 9, CNM 204 of each node can periodically receive messages from other nodes in the database to determine if the other nodes are currently in communication with the node that receives the message. In such an example, process 1000 can compare information about which nodes store the shards identified at 1006 to the information about which nodes the node hosting the proxy that received the message at 1002 can currently communicate with. Based on such a comparison, the proxy can determine whether each node identified at 1006 is on the same side of the network split as the node hosting the proxy.

In some embodiments, proxy 202 can determine whether each node identified at 1006 based on CCS 208 is in communication with the node hosting the proxy that received the request at 1002 based on messages received by CNM 204 of the node hosting the proxy that received the request at 1002 (and/or the absence of messages received by CNM 204).

At 1010, process 1000 can determine whether a particular node storing either a master shard or a slave shard that includes an object referenced by the request received at 1002 is in communication with the node hosting the proxy that received the request at 1002.

If process 1000 determines that a particular node (either a master node or slave node) storing a shard that includes an object referenced by the request is connected to the node hosting the proxy that received the request at 1002 ("YES" at 1010), process 1000 can proceed to 1012. At 1012, process 1000 can route the request to a node storing either a master shard or a slave shard that includes the object referenced by the request. In some embodiments, process 1000 can route the request to either the node storing the master shard or the node storing the slave shard based on any suitable factors. For example, if both nodes are connected to the node hosting the proxy that received the request at 1002, proxy 202 of the node hosting the proxy that received the request can determine which node to route the request to based on any suitable criteria (e.g., as described above in connection with FIG. 2). However, if only one of the nodes is available, for example, because both the node hosting proxy 202 and the node storing either the master shard or slave shard are on the same side of a network split, proxy 202 can route the request to the available node. In some embodiments, in addition to determining whether at least one node that includes an object referenced by the request is on the same side of the network split as the node hosting the proxy that received the request at 1002, process 1000 can determine whether the node hosting the proxy that received the request at 1002 is on the minority side of a network split or the majority side of a network split (e.g., as described below in connection with 1020 of FIG. 10B). In such embodiments, if process 1000 determines that the node hosting the proxy that received the request at 1002 is on the minority side of the network split, process 1000 can inhibit a read request from being routed to the node storing a master shard or a slave shard unless both the node storing the master shard and the node storing the slave shard are both connected to the node hosting the proxy that received the request at 1002.

Otherwise, if process 1000 determines that neither node (i.e., neither the master node nor a slave node) storing a shard that includes an object referenced by the request is not connected to the node hosting the proxy that received the request at 1002 ("NO" at 1010), process 1000 can proceed to 1014. At 1014, process 1000 can cause information to be returned indicating that an operation requested at 1002 cannot be completed at the current time. In some embodiments, process 1000 can return any suitable information and/or can return the information at any suitable time. For example, process 1000 can return an error to application 104 and/or client device 610 that requested that the operation be performed indicating that at least a portion of the requested operations (or operation) cannot be completed. In some embodiments, process 1000 can perform read operations for objects that are included in shards stored by nodes in communication with the node hosting the proxy that received the request at 1002 and return errors for read operations for objects that are included only in shards stored by nodes not in communication with the node hosting the proxy that received the request at 1002. Alternatively, if a single object referenced by the request is included in shards stored by nodes not in communication with the node hosting the proxy that received the request at 1002, process 1000 can return an error for the entire request. In some embodiments, process 1000 can indicate to the requesting application 104 and/or client device 610 which operation or operations cannot currently be performed.

Returning to 1004, if process 1000 determines that the operation is an operation that involves writing information to the database ("WRITE" at 1004), process 1000 can proceed to 1016 in FIG. 10B. At 1016, process 1000 can determine whether the node hosting the proxy that received the request at 1002 is on a minority side of a network split. In some embodiments, a minority side of a network split can be a side of the split that includes less than half of the nodes in the database cluster (note that with an odd number of nodes, there can never be exactly half of the nodes on one side of a network split). As described above, the database cluster has an odd number of nodes (which may include a quorum node) such that a node can never be in communication with exactly half of the nodes in the database cluster. In some embodiments, process 1000 can use any suitable technique or combination of techniques to determine whether the node hosting the proxy that received the request at 1002 is on the minority side of a network split. For example, in some embodiments, CNM 204 of each node can determine whether a message has been received from a CNM of each other node in the database cluster within a particular period of time. In such embodiments, based on the nodes from which messages have been received, CNM 204 can determine whether it is on a minority side of a network split based on whether messages have been received from less than (N-1)/2 other nodes, where N is the number of nodes that normally make up the database cluster from CCS 208.

If process 1000 determines that the node hosting the proxy that received the request at 1002 is on a minority side of a network split ("YES" at 1020), process 1000 can proceed to 1014, and can cause information to be returned indicating that an operation requested at 1002 cannot be completed at the current time.

Otherwise, if process 1000 determines that the node hosting the proxy that received the request at 1002 is not on a minority side of a network split ("NO" at 1020), process 1000 can proceed to 1022. At 1022, process 1000 can determine if each of the shards identified at 1016 are stored by a node in communication with the node hosting the proxy that received the request at 1002 that received the request at 1002. In some embodiments, process 1000 can use any suitable technique or combination of techniques to determine whether a particular node is in communication with the node hosting the proxy that received the request at 1002, such as techniques described above in connection with 1008.

At 1024, process 1000 can determine whether a particular node storing a master shard that includes an object referenced by the request received at 1002 is in communication with the node hosting the proxy that received the request at 1002.

If process 1000 determines that a particular master node storing a shard that includes an object referenced by the request is connected to the node hosting the proxy that received the request at 1002 ("YES" at 1024), process 1000 can proceed to 1026. At 1026, process 1000 can route the request to a node storing a master shard that includes the object referenced by the request.

Otherwise, if process 1000 determines that the master node storing a shard that includes an object referenced by the request is not connected to the node hosting the proxy that received the request at 1002 ("NO" at 1024), process 1000 can proceed to 1014.

Figure 11A:
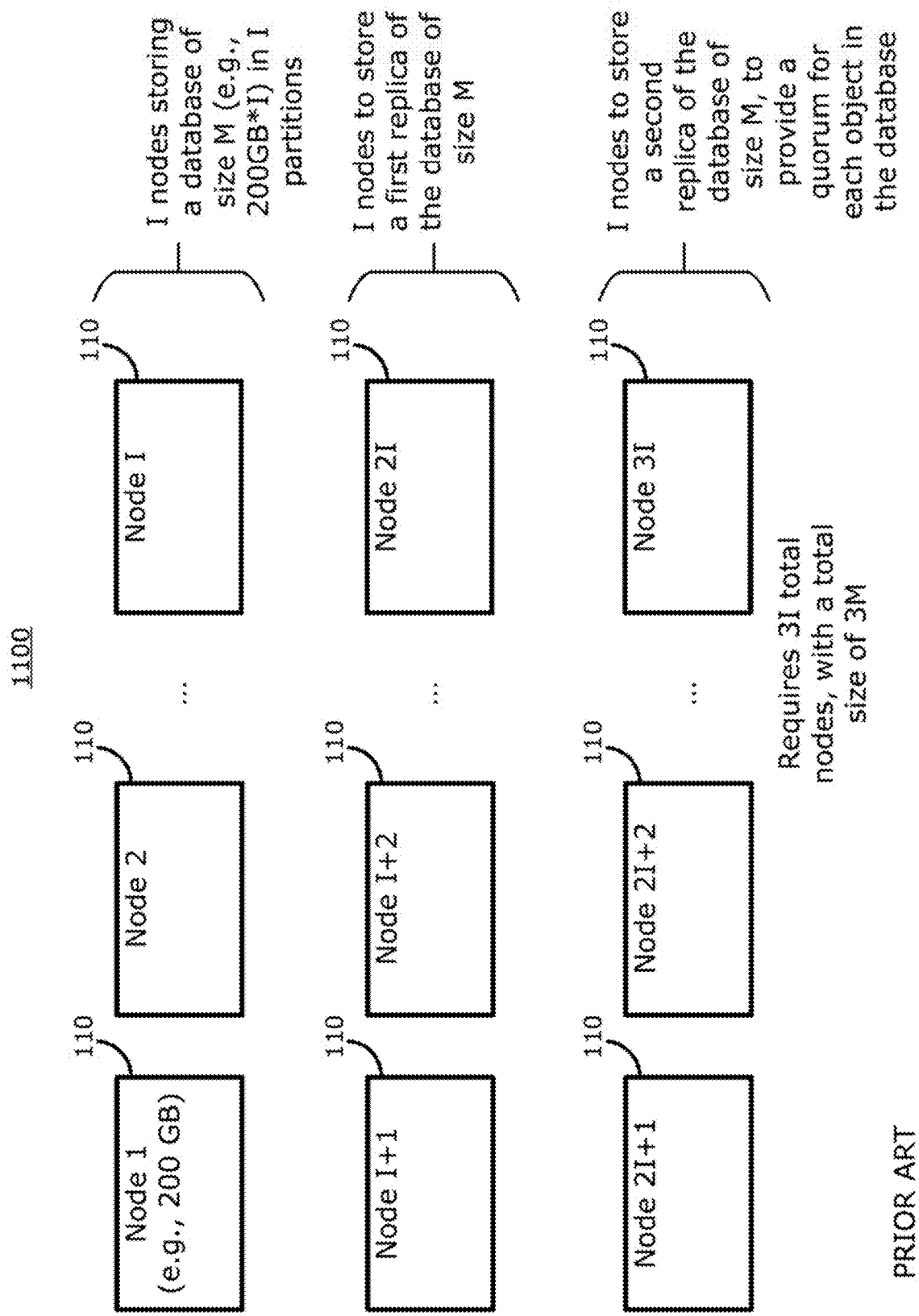
FIGS. 11A and 11B show examples of nodes used in a conventional replicated distributed database implementation and nodes used in a replicated distributed database configured in accordance with some embodiments of the disclosed subject matter, respectively.
Figure 11B:
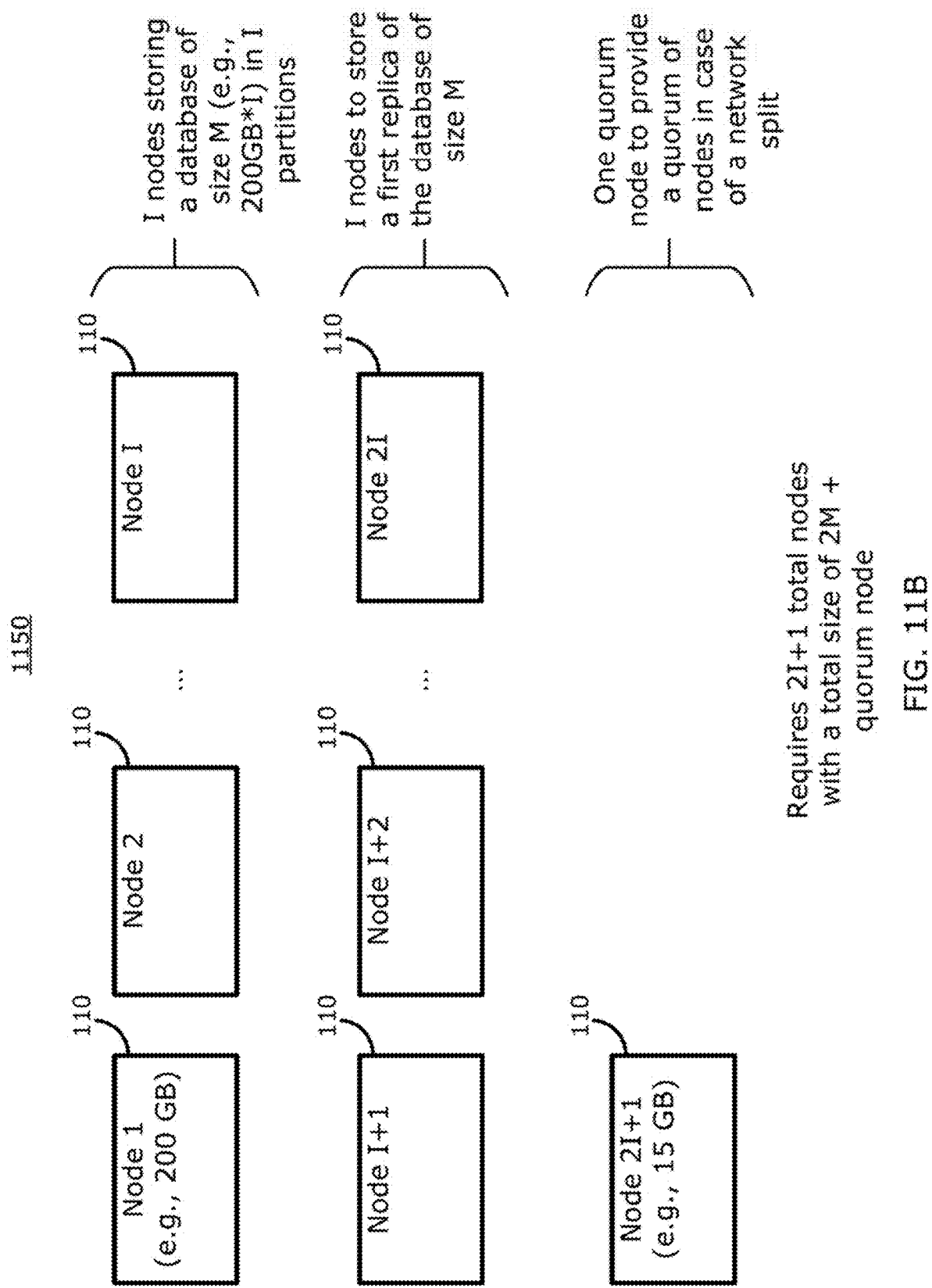

FIGS. 11A and 11B show examples of nodes used in a conventional replicated distributed database implementation and nodes used in a replicated distributed database configured in accordance with some embodiments of the disclosed subject matter, respectively. As shown in FIG. 11A, a conventional replicated distributed database of size M can be distributed among 3*I nodes, where I is the number of nodes used to store one copy of the distributed database. In some embodiments, the database can be stored across I nodes, which can each store a portion of the database, where each portion can be the same size, or the size can vary across the I nodes. For example, in the case of a database having size M equal to about 10,000 GB, each of nodes 1-I can store about a 200 GB portion of the database, requiring about 50 nodes to store the entire database. In some embodiments where high availability of the database is desirable, a first replica of the database can be stored, for example across another I nodes (e.g., nodes I+1 to 21). This can provide access to the information in the database when one or more of the first I nodes (e.g., nodes 1 to I) is not accessible to a client device. However, allowing access to the replica of a particular object when the node storing the original version of the object is not accessible can result in the information stored in the database diverging from the information stored in the replica. As described above, in conventional implementations this can require that there be a second replica (e.g., across nodes 2I+1 to 3I), and requiring that a majority of the copies be in communication with one another and that a majority of the copies vote to allow a change. Accordingly, the database and the two replicas can require 30,000 GB of memory.

FIG. 11B shows an example of nodes of a replicated distributed database of size M that is configured in accordance with some embodiments of the disclosed subject matter. As shown in FIG. 11B, the database of size M can be distributed among the same I nodes, a replica of the database can be distributed among the same nodes I+1 to 2I. However, in the configuration shown in FIG. 11B, the third replica can be replaced by a quorum node (e.g., node 2I+1), which may or may note store a portion of the database. Taking the same example as described in FIG. 11A of a database of size M equal to about 10,000 GB with each of 50 nodes storing about a 200 GB portion of the database, the replicated distributed database can use about two thirds of the memory of the conventional configuration (i.e., around 20,000 GB). This can result in significant cost savings for the owner of the database. In one particular example in which memory costs about $70 per GB per year, the conventional configuration could cost upwards of $2.1 million per year for the memory alone, whereas the replicated distributed database configured in accordance with the subject matter described herein could cost around $1.4 million.

Figure 12:
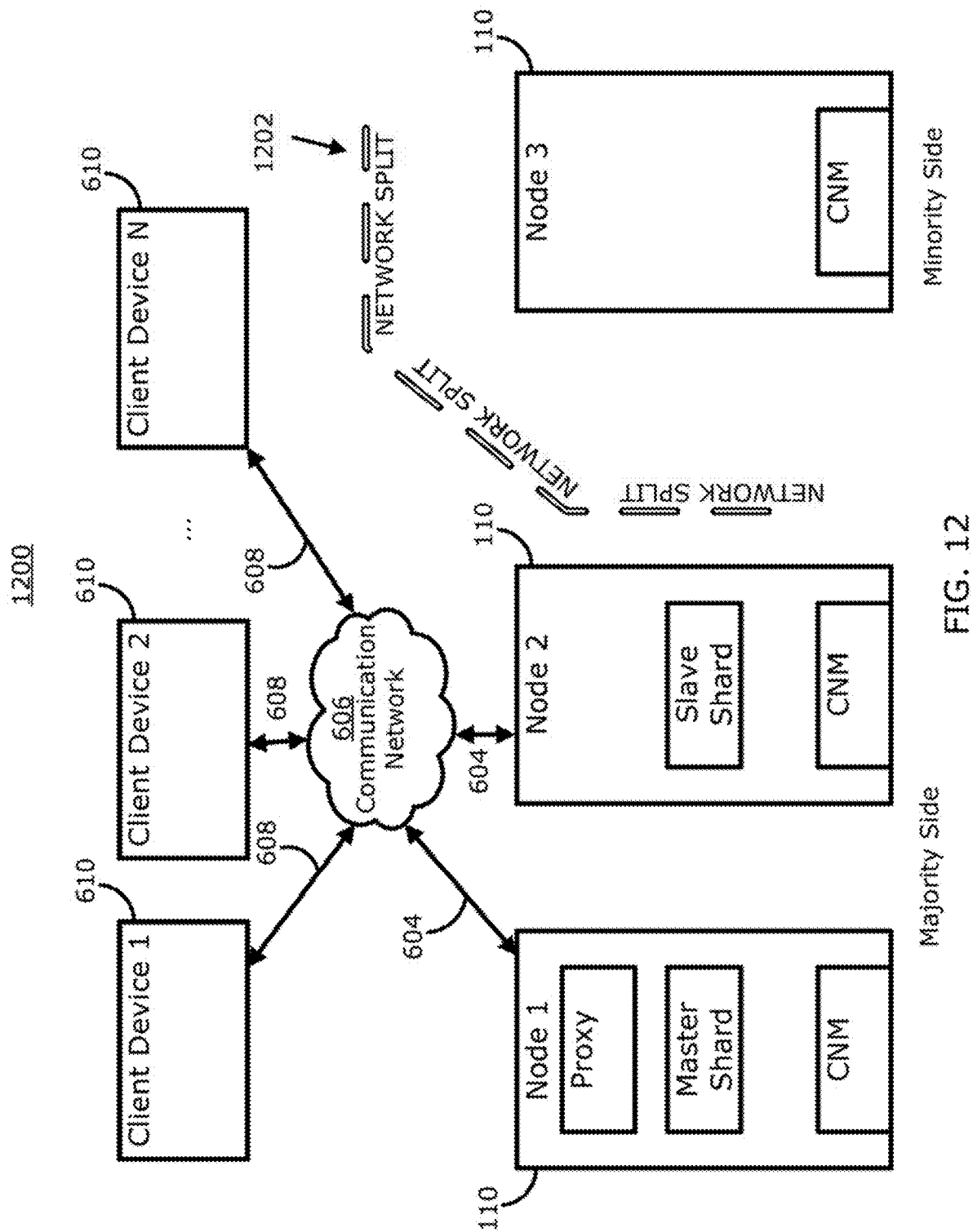
FIGS. 12-18 show examples of various shard and proxy configurations in connection with network splits in accordance with some implementations of the disclosed subject matter.

FIGS. 12-18 show examples of various shard and proxy configurations in connection with network splits in accordance with some implementations of the disclosed subject matter. FIG. 12 shows an example 1200 of a configuration of three nodes (e.g., Node 1, Node 2 and Node 3) during a network split represented by dashed line 1202. As shown in configuration 1200, Node 1 hosts a proxy that Client Devices 1-N can contact to attempt to perform operations to at least one object included in the master shard stored in Node 1 and included in the slave shard stored by Node 2. As described above in connection with, for example, FIGS. 10A and 10B, when the proxy hosted by Node 1 receives a request (e.g., from client device 1) to perform an operation (e.g., a read operation or a write operation), the proxy can determine which shards include the object on which the operation is to be performed. In the example of configuration 1200, the proxy determines that the object is included in the master shard and the slave shard depicted in configuration 1200. The proxy can also determine that it is hosted by a node on the majority side of network split 1202 based on information received by Node 1 from Node 2, and based on a lack of information received from Node 3. Accordingly, because both the master shard and the slave shard that include the object are on the majority side of the split, the proxy can route the received request normally (e.g., routing write requests to Node 1 storing the master shard and read requests to either Node 1 storing the master shard or Node 2 storing the slave shard) regardless of whether it is a request to perform a read operation or a request to perform a write operation.

Figure 13A:
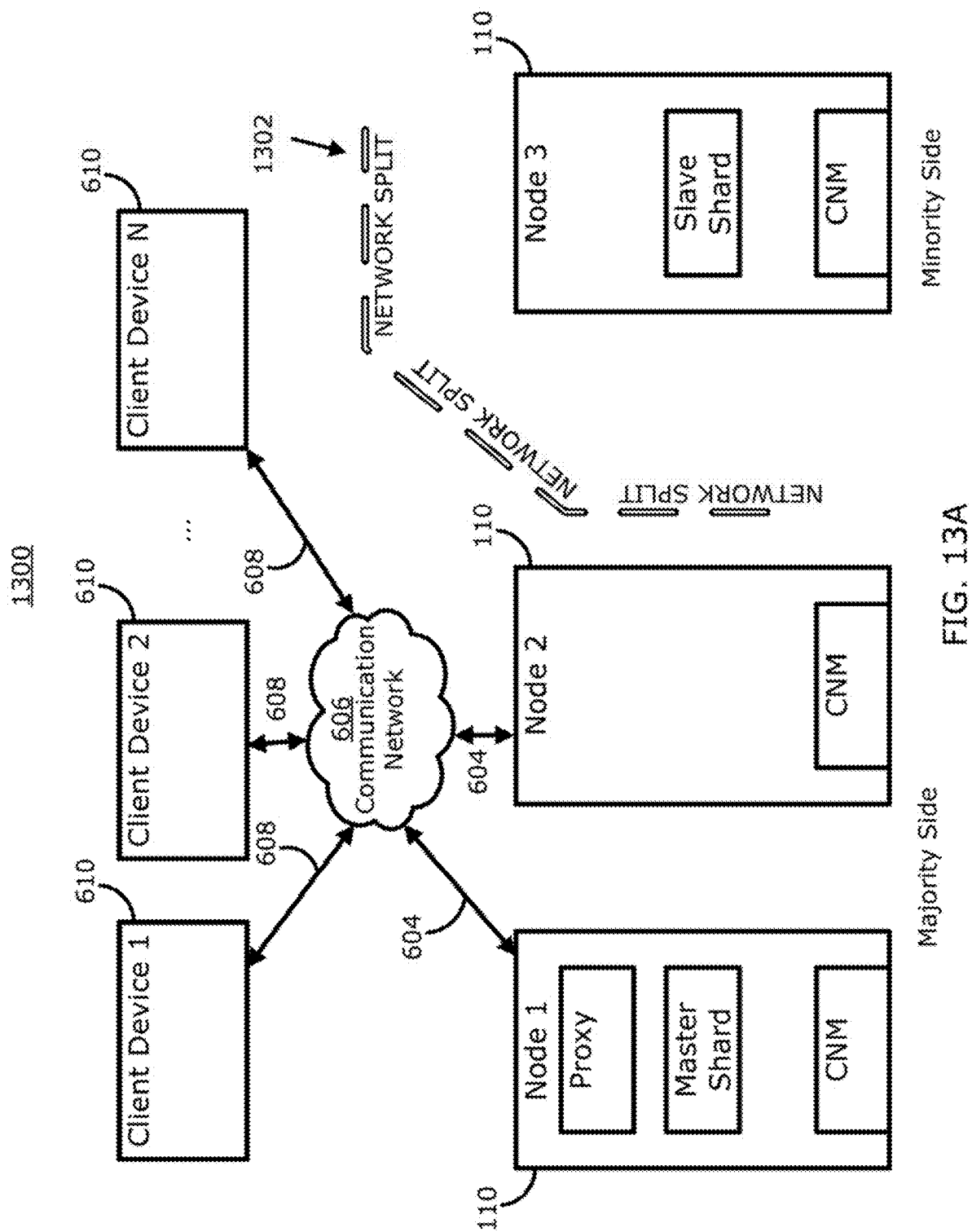
Figure 13B:
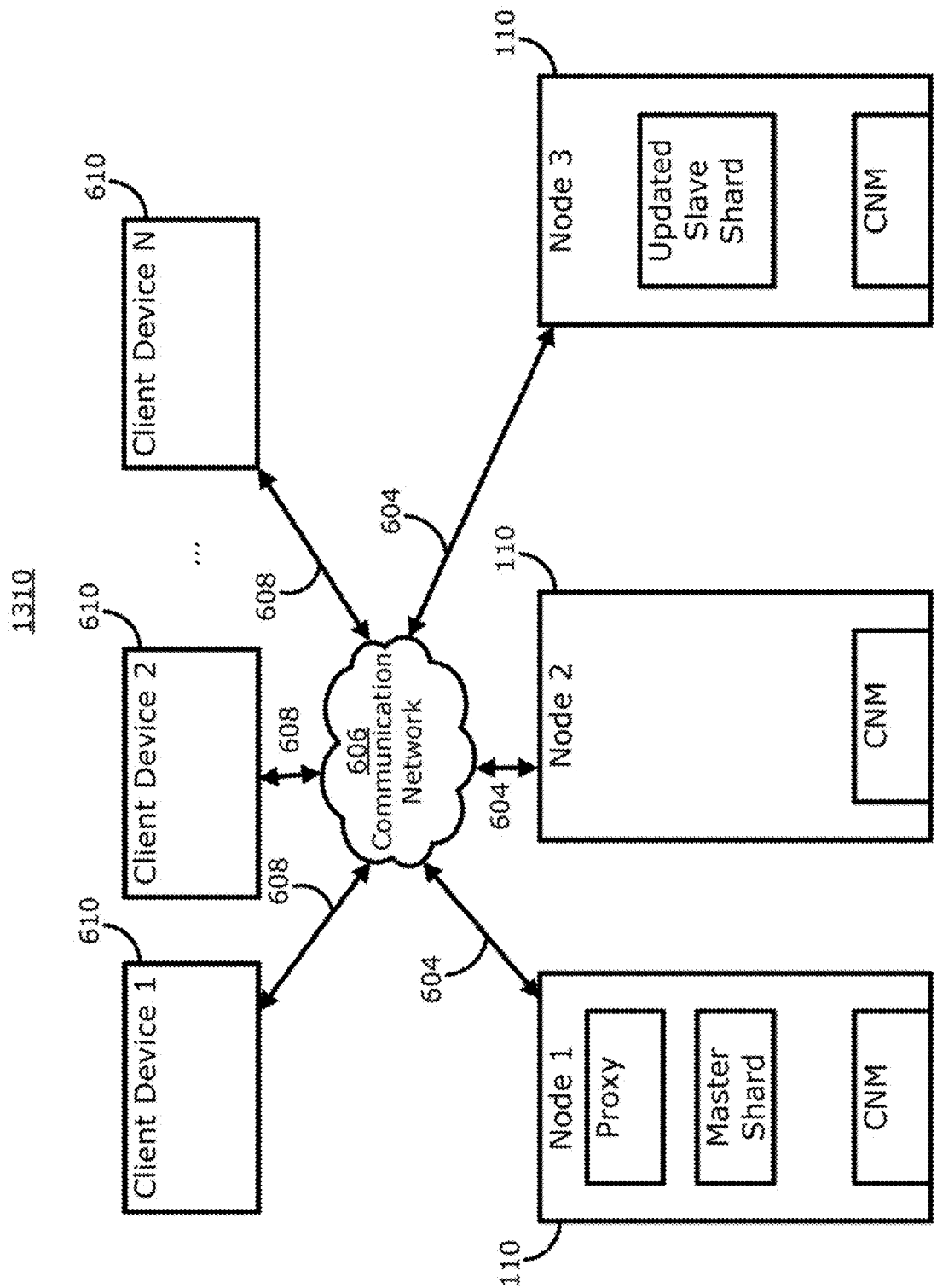

FIG. 13A shows an example 1300 of a configuration of Node 1, Node 2 and Node 3 during a network split represented by dashed line 1302. As shown in configuration 1300, Node 1 hosts a proxy that Client Devices 1-N can contact to attempt to perform operations to at least one object included in the master shard stored in Node 1 and included in the slave shard stored by Node 3. As described above in connection with, for example, FIGS. 10A and 10B, when the proxy hosted by Node 1 receives a request (e.g., from client device 1) to perform an operation (e.g., a read operation or a write operation), the proxy can determine which shards include the object on which the operation is to be performed. In the example of configuration 1300, the proxy determines that the object is included in the master shard and the slave shard depicted in configuration 1300. The proxy can also determine that it is on the majority side of network split 1302 based on information received by Node 1 from Node 2, and based on a lack of information received from Node 3. Accordingly, because the master shard that includes the object is located on the majority side of the split, the proxy can route the received request to the master shard regardless of whether it is a request to perform a read operation or a request to perform a write operation due to the inaccessibility of the slave shard. FIG. 13B shows a configuration 1310 of Node 1, Node 2 and Node 3 after network split 1302 has been resolved. As shown in FIG. 13B, the slave shard stored by Node 3 can be updated with any changes made to the master shard stored by Node 1 during the network split.

Figure 14A:
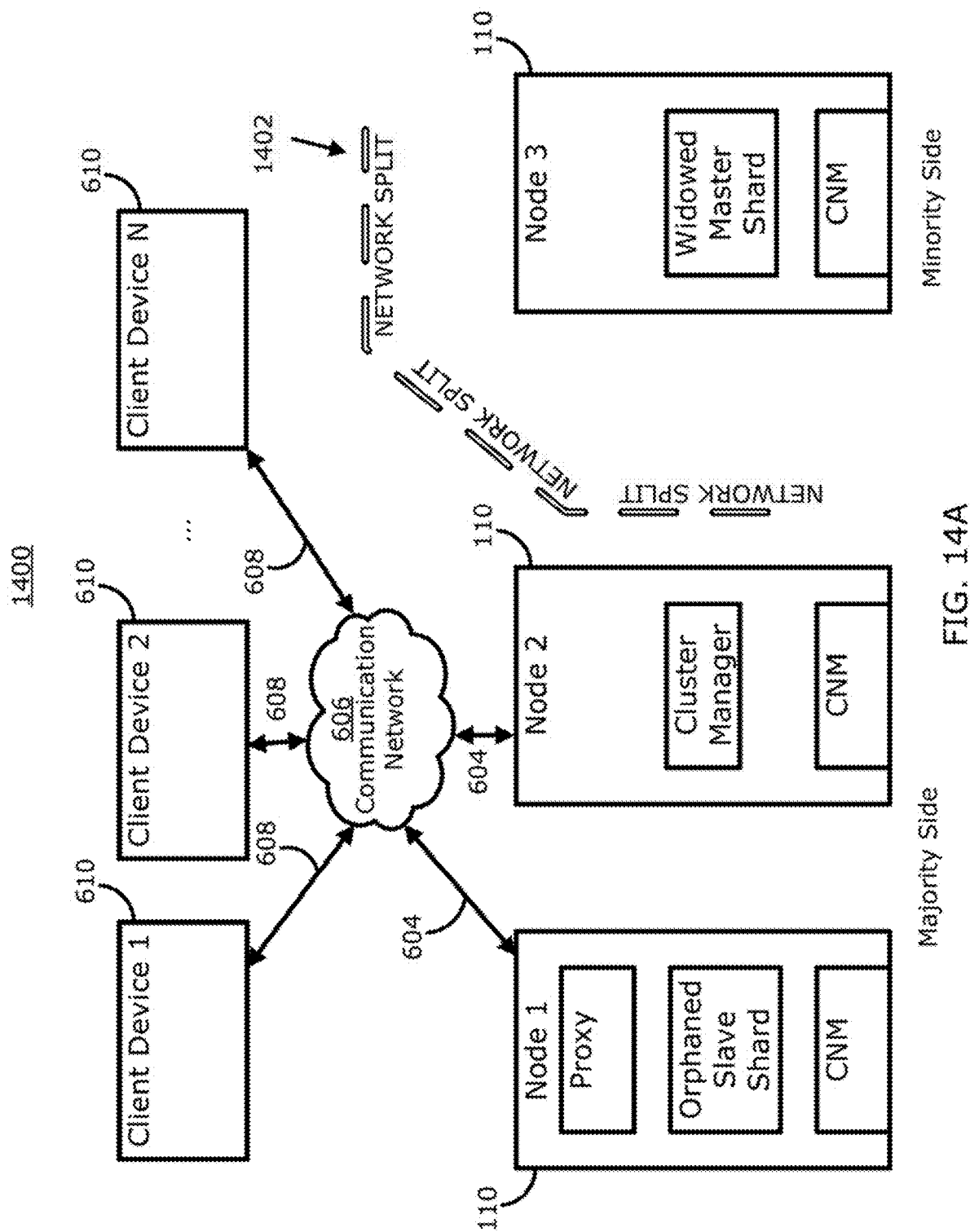
Figure 14B:
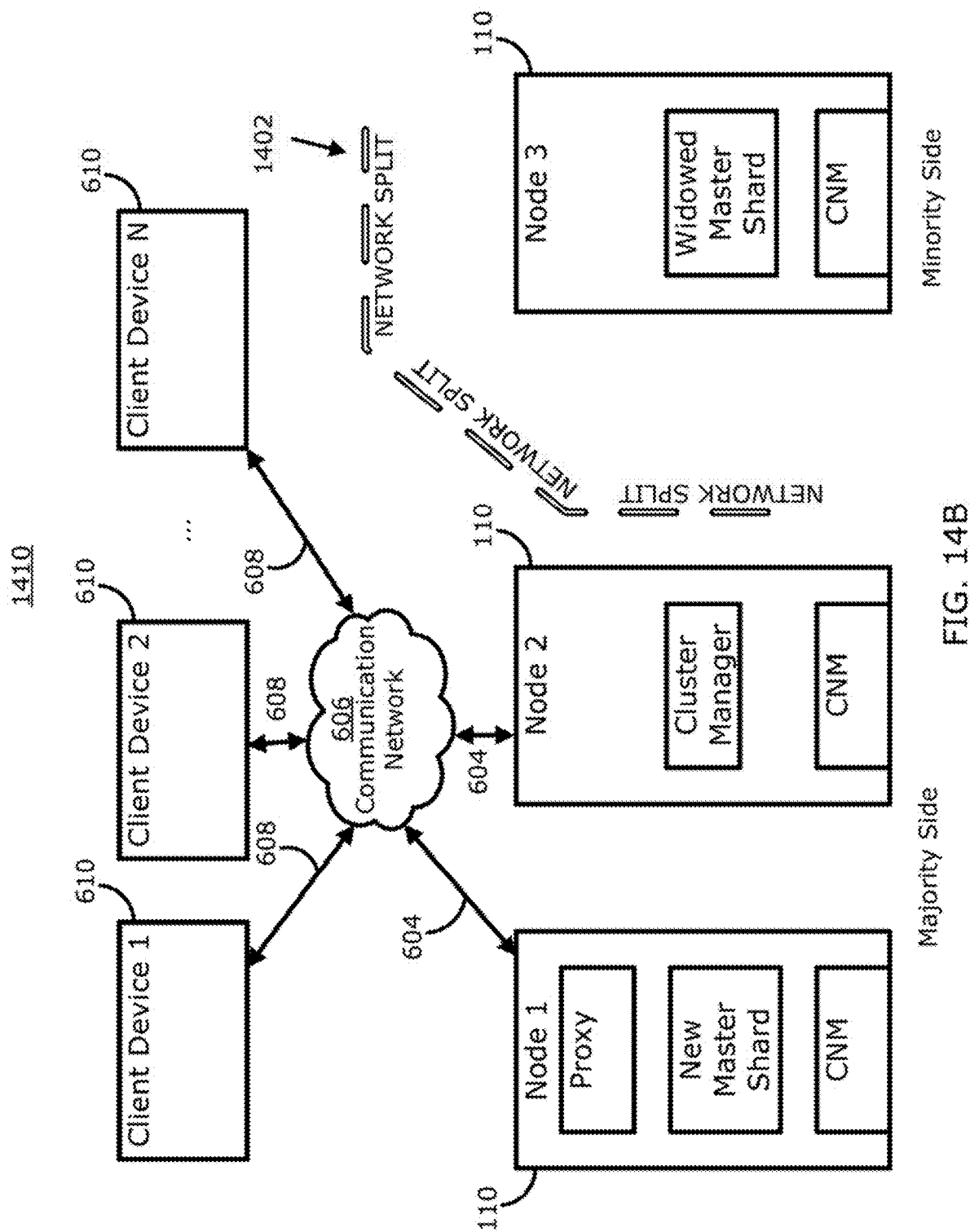
Figure 14C:
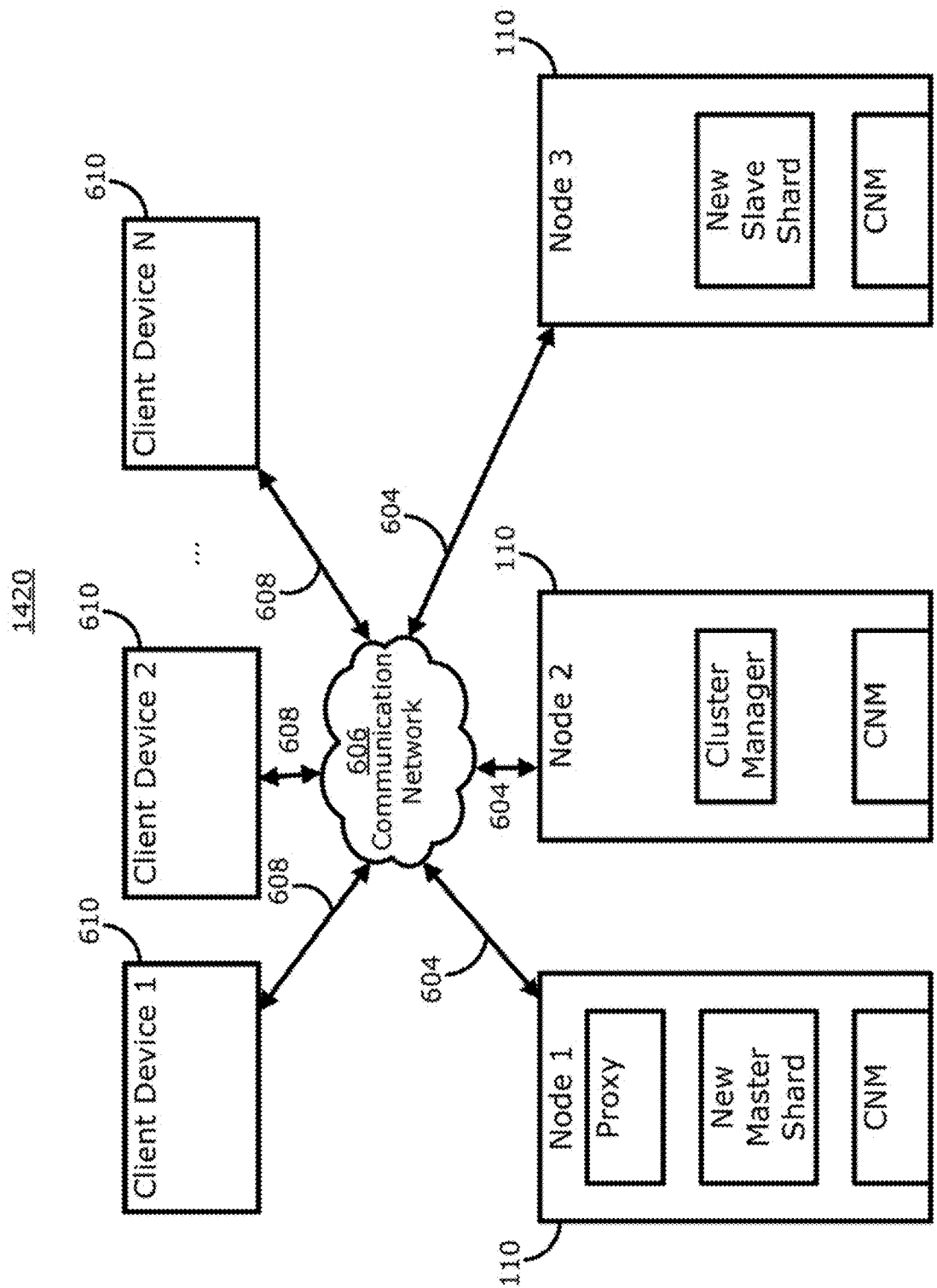

FIG. 14A shows an example 1400 of a configuration of Node 1, Node 2 and Node 3 during a network split represented by dashed line 1402. As shown in configuration 1400, Node 1 hosts a proxy that Client Devices 1-N can contact to attempt to perform operations to at least one object included in the widowed master shard stored in Node 3 and included in the orphaned slave shard stored by Node 1. As described above in connection with, for example, FIGS. 10A and 10B, when the proxy hosted by Node 1 receives a request (e.g., from client device 1) to perform an operation (e.g., a read operation or a write operation), the proxy can determine which shards include the object on which the operation is to be performed. In the example of configuration 1400, the proxy determines that the object is included in the widowed master shard and the orphaned slave shard depicted in configuration 1400. The proxy can also determine that it is on the majority side of network split 1402 based on information received by Node 1 from Node 2, and based on a lack of information received from Node 3. Additionally, Node 2, acting as the cluster manager node (elected either before the network split or after the network split occurs as described above in connection with FIG. 9) can determine that the orphaned slave shard is to be designated as a new master shard. In some embodiments, a request received from a client device that references an object stored by the orphaned slave shard can be denied or delayed until the orphaned slave shard has been re-designated as the new master shard (e.g., by Node 2 acting as the cluster manager node). Additionally or alternatively, in some embodiments, the proxy can anticipate that the orphaned slave shard will be re-designated as the new master shard and can route the request accordingly as though it were the master shard (e.g., as described above in connection with configuration 1300). FIG. 14B shows a configuration 1410 of Node 1, Node 2 and Node 3 after the orphaned slave shard has been re-designated as the new master shard, but the widowed master shard may not have been re-designated as the new slave shard (e.g., because the cluster manager node is on the majority side of the split). FIG. 14C shows a configuration 1420 of Node 1, Node 2 and Node 3 after network split 1402 has been resolved. As shown in FIG. 14C, the widowed master shard stored by Node 3 can be re-designated as the new slave shard and can be updated with any changes made to the new master shard stored by Node 1 during the network split (e.g., as described above in connection with configuration 1310).

Figure 15A:
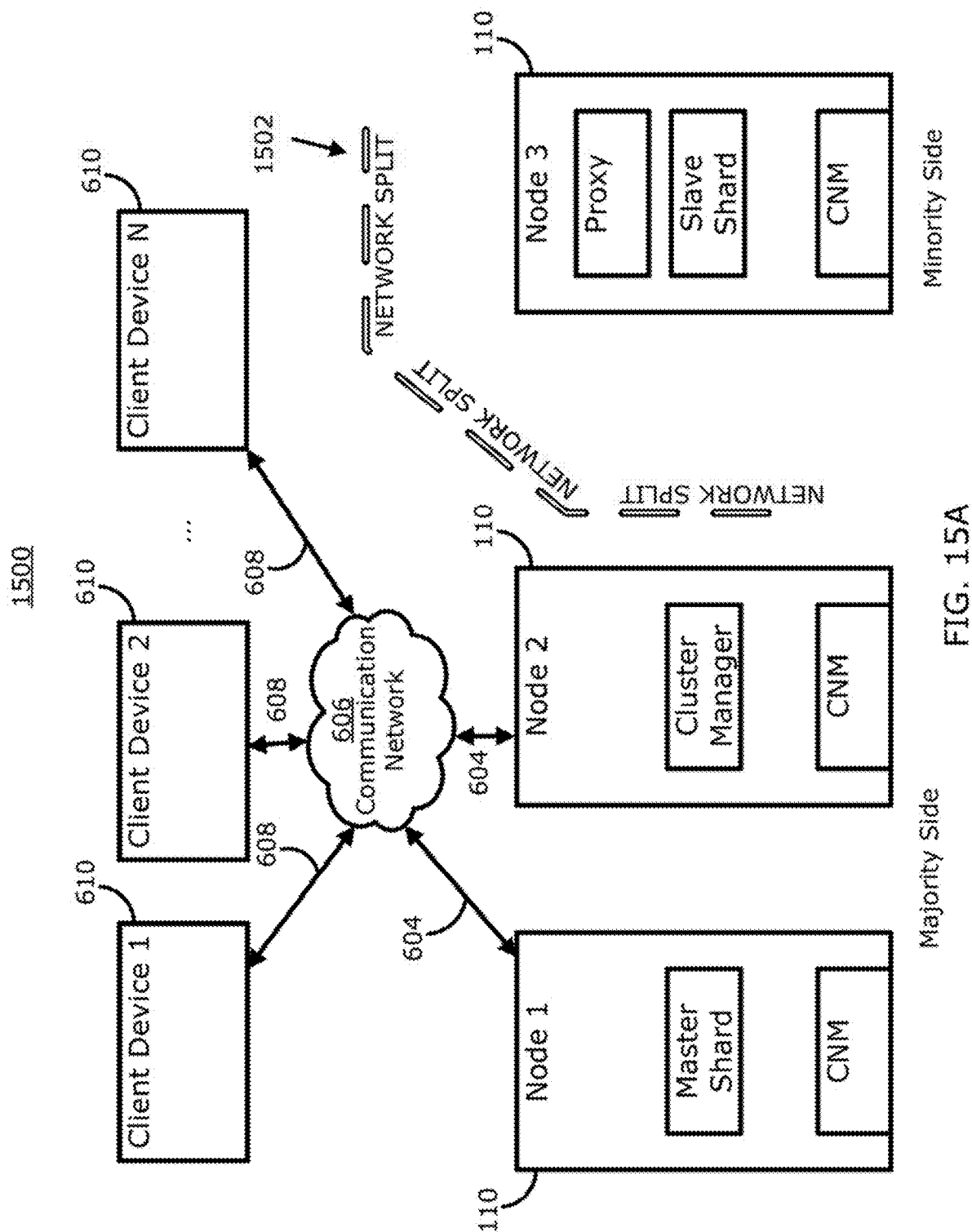
Figure 15B:
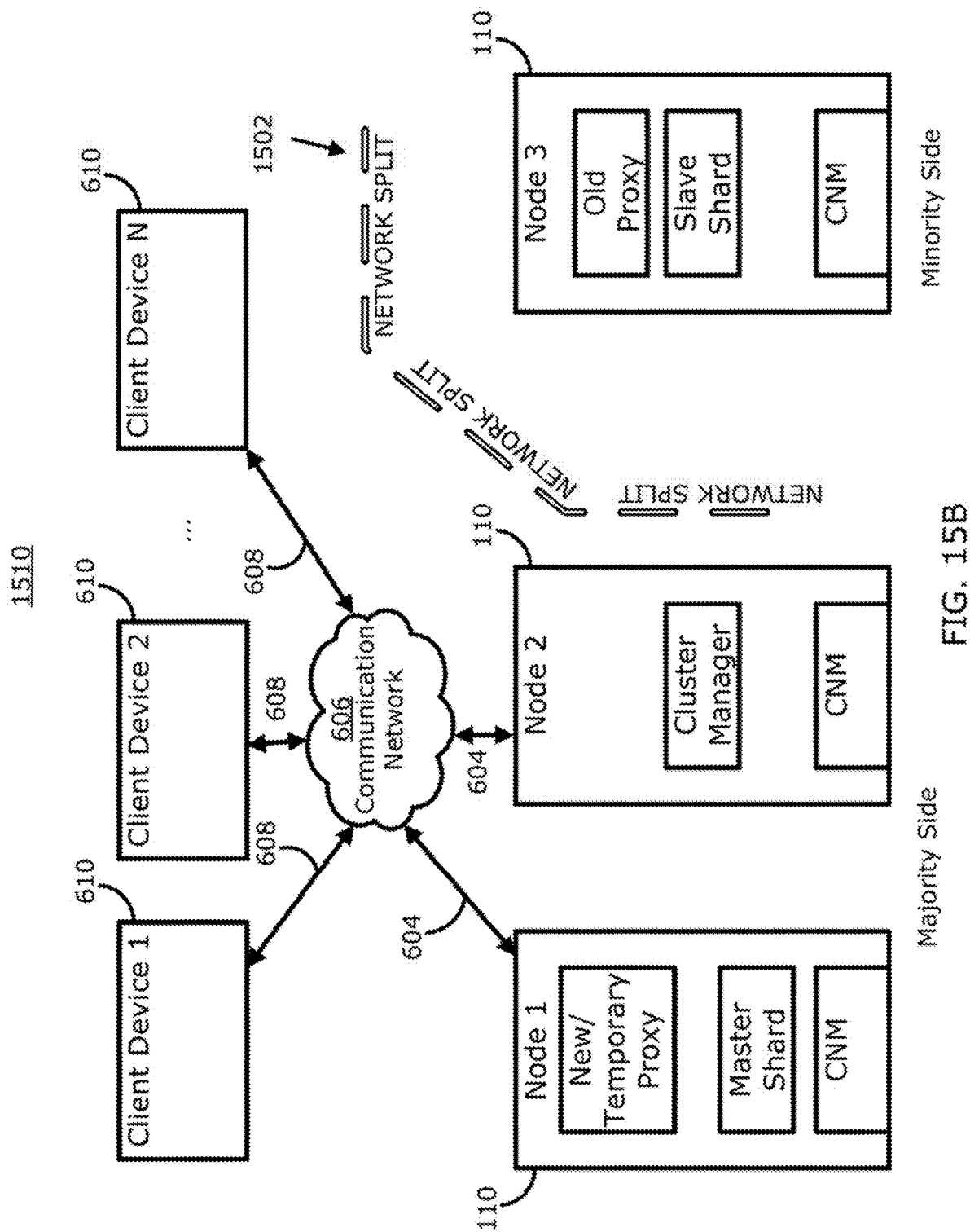
Figure 15C:
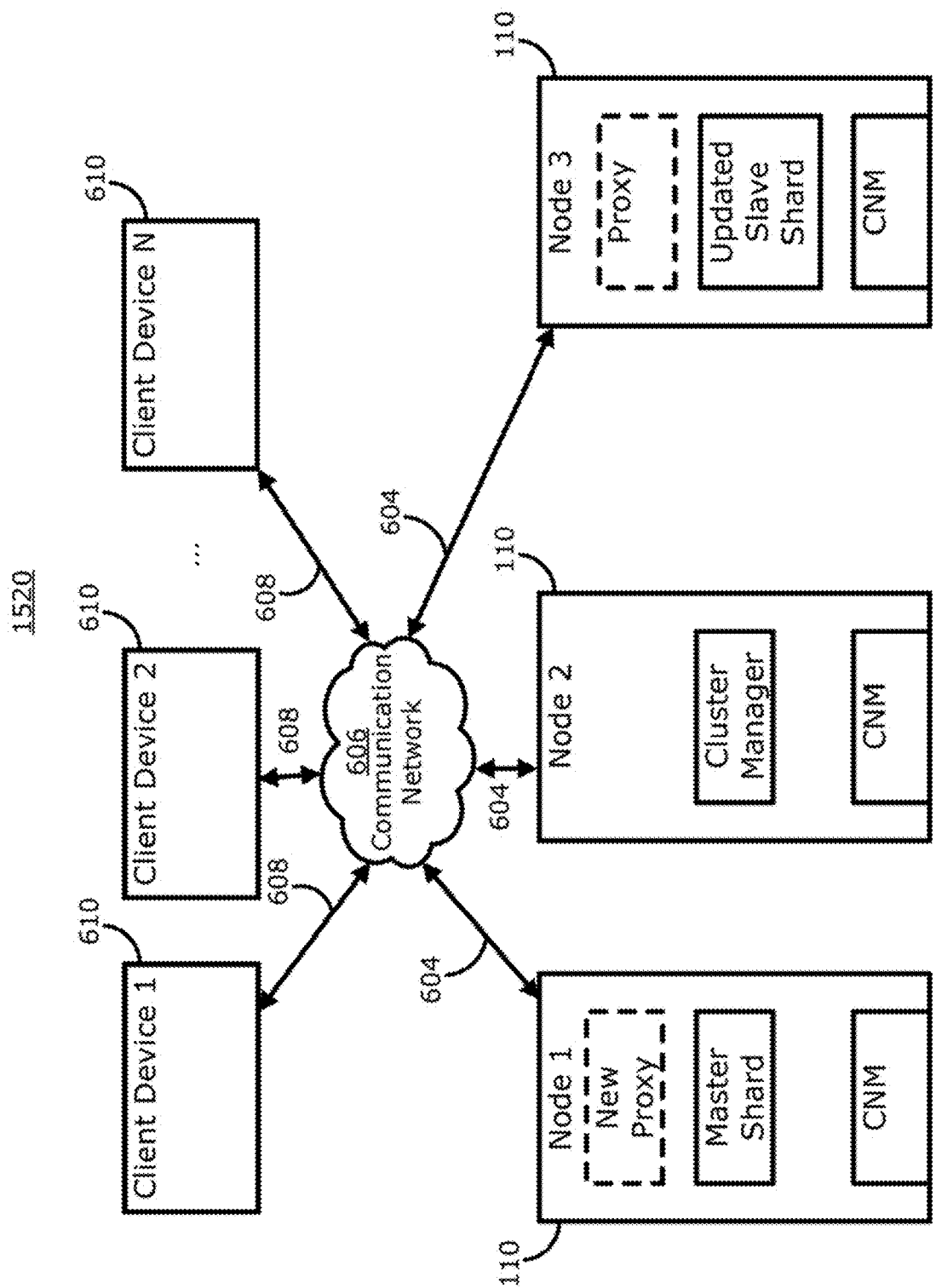

FIG. 15A shows an example 1500 of a configuration of Node 1, Node 2 and Node 3 during a network split represented by dashed line 1502. As shown in configuration 1500, Node 3 hosts a proxy that Client Devices 1-N could contact, prior to the network split, to attempt to perform operations to at least one object included in the master shard stored in Node 1 and included in the slave shard stored by Node 3. As described above in connection with FIG. 9, Node 2, acting as the cluster manager node, can determine that no proxy is serving at least one object included in the master shard stored by Node 1 because the proxy hosted by Node 3 is not located on the majority side of the network split. FIG. 15B shows an example of a configuration 1510 Node 1, Node 2 and Node 3 after a proxy hosted by Node 1 has been designated as the proxy that routes requests that reference the object included in the master shard stored by Node 1 and the slave shard stored by Node 3. In configuration 1500 of FIG. 15A Client Devices 1-N were not able to access the objects stored in the master shard and the slave shard because the proxy was located on the other side of the network split from the client devices. After the proxy hosted by Node 1 has been designated the new proxy, however, the client devices can perform operations on the master shard normally despite the network split (e.g., as described above in connection with configuration 1300 of FIG. 13A), because the master shard is located on the majority side of the network split. FIG. 15C shows a configuration 1520 of Node 1, Node 2 and Node 3 after network split 1502 has been resolved. As shown in FIG. 15C, the slave shard stored by Node 3 can be updated with any changes made to the master shard stored by Node 1 during the network split. Additionally, in some embodiments, the functions that were assigned to the proxy hosted by Node 1 can either continue to be assigned to the proxy hosted by Node 1, or at least some of those functions can be assigned back to the proxy hosted by Node 3.

Figure 16A:
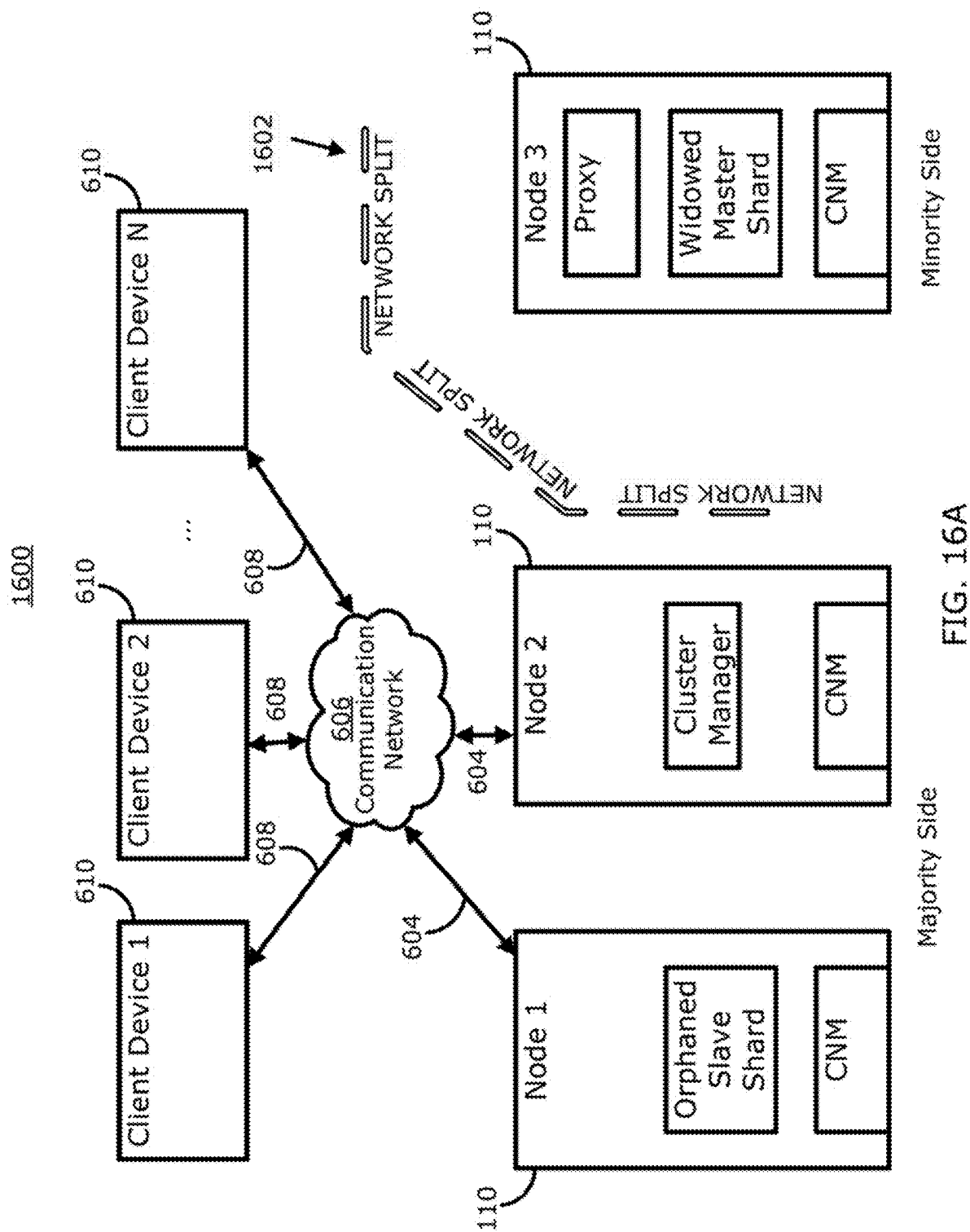
Figure 16B:
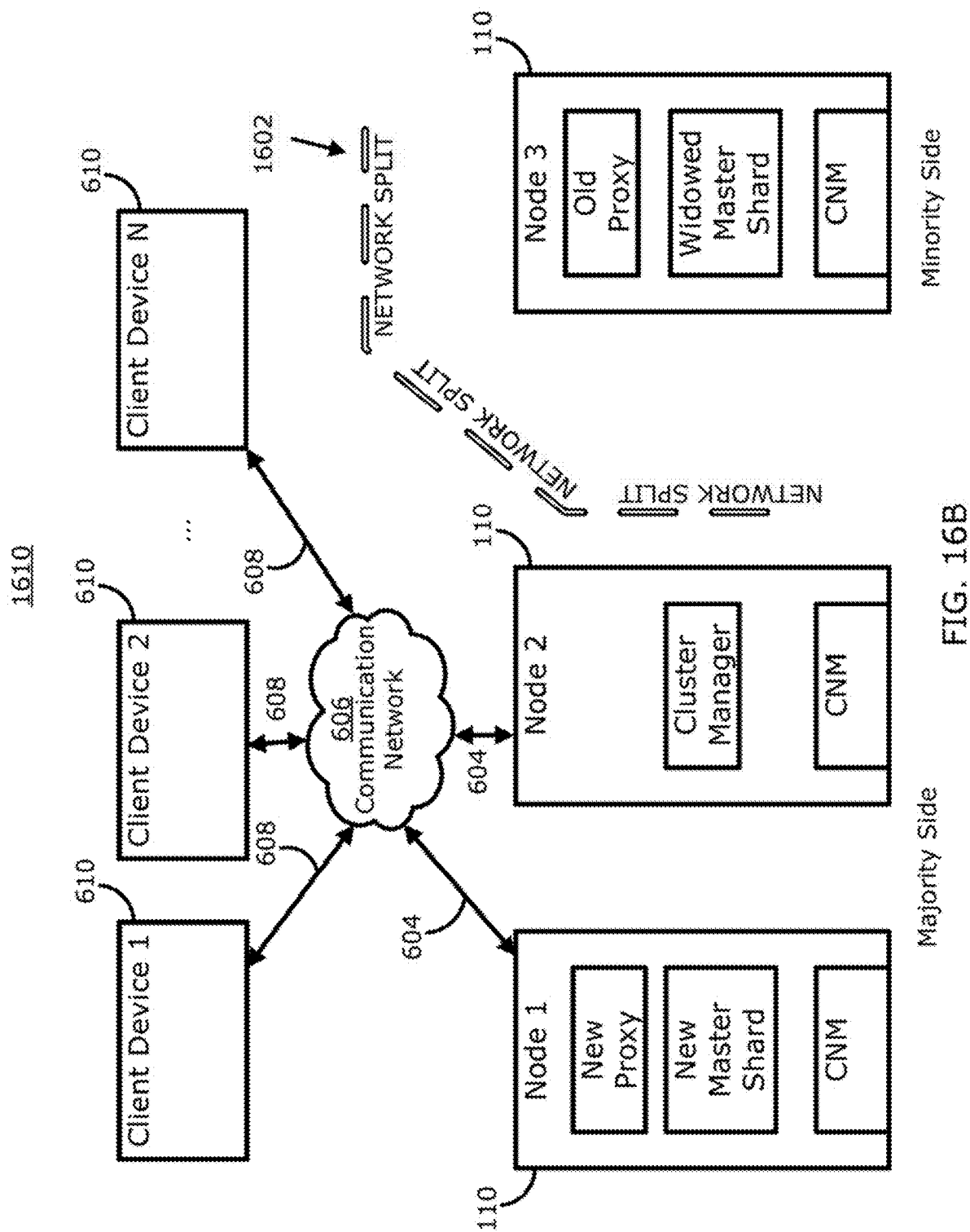
Figure 16C:
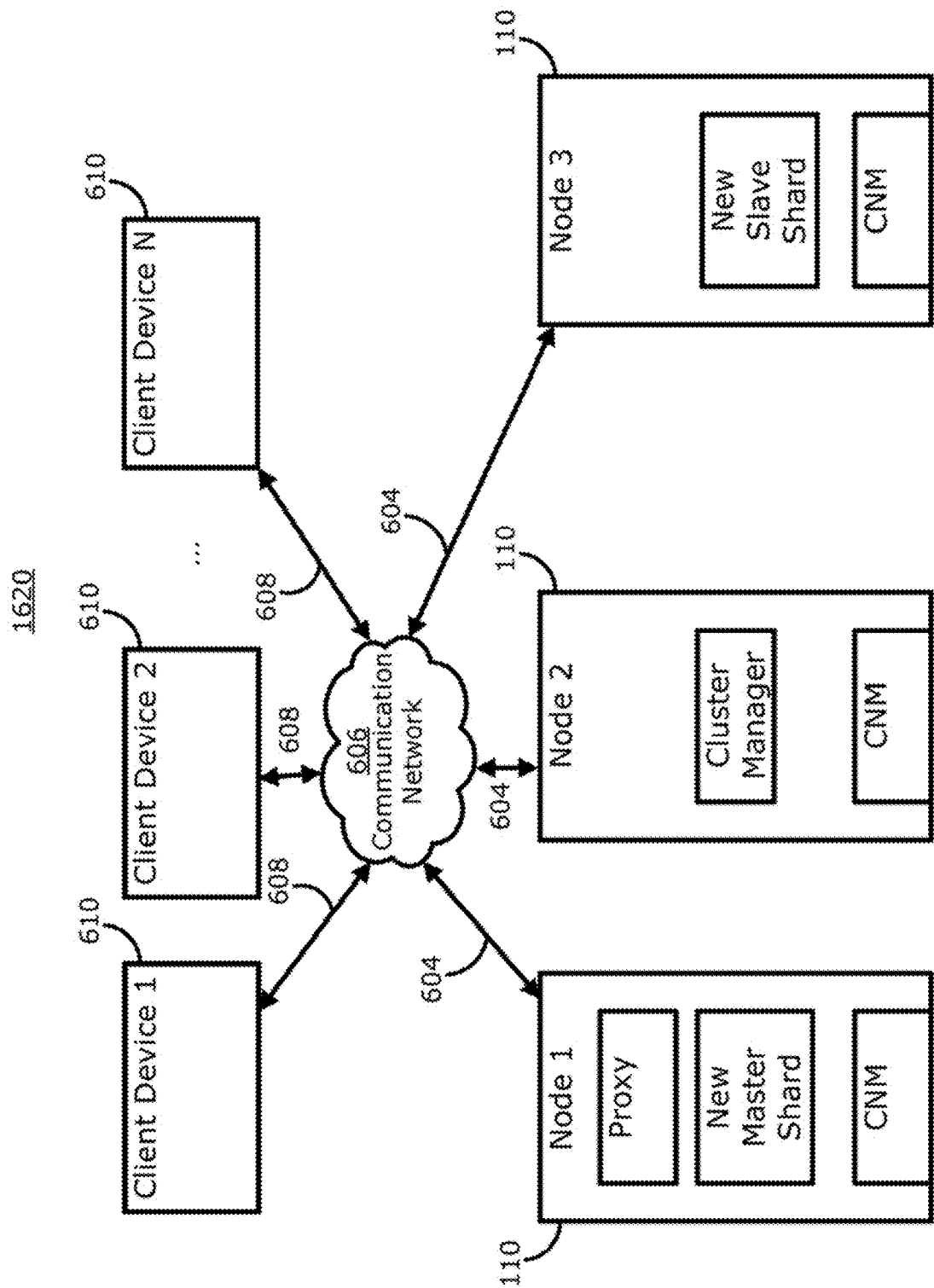

FIGS. 16A-16C show examples 1600, 1610 and 1620, respectively, of configurations of Node 1, Node 2 and Node 3 during a network split represented by dashed line 1602. As shown in FIGS. 16A-16C, the operation of the database depicted in these configurations is similar to the operations described above in connection with FIGS. 15A-15C where the proxy is located on the minority side of the network split, and FIGS. 14A-14C, where there is a widowed master shard stored on Node 3 and an orphaned slave shard stored on Node 1.

Figure 17A:
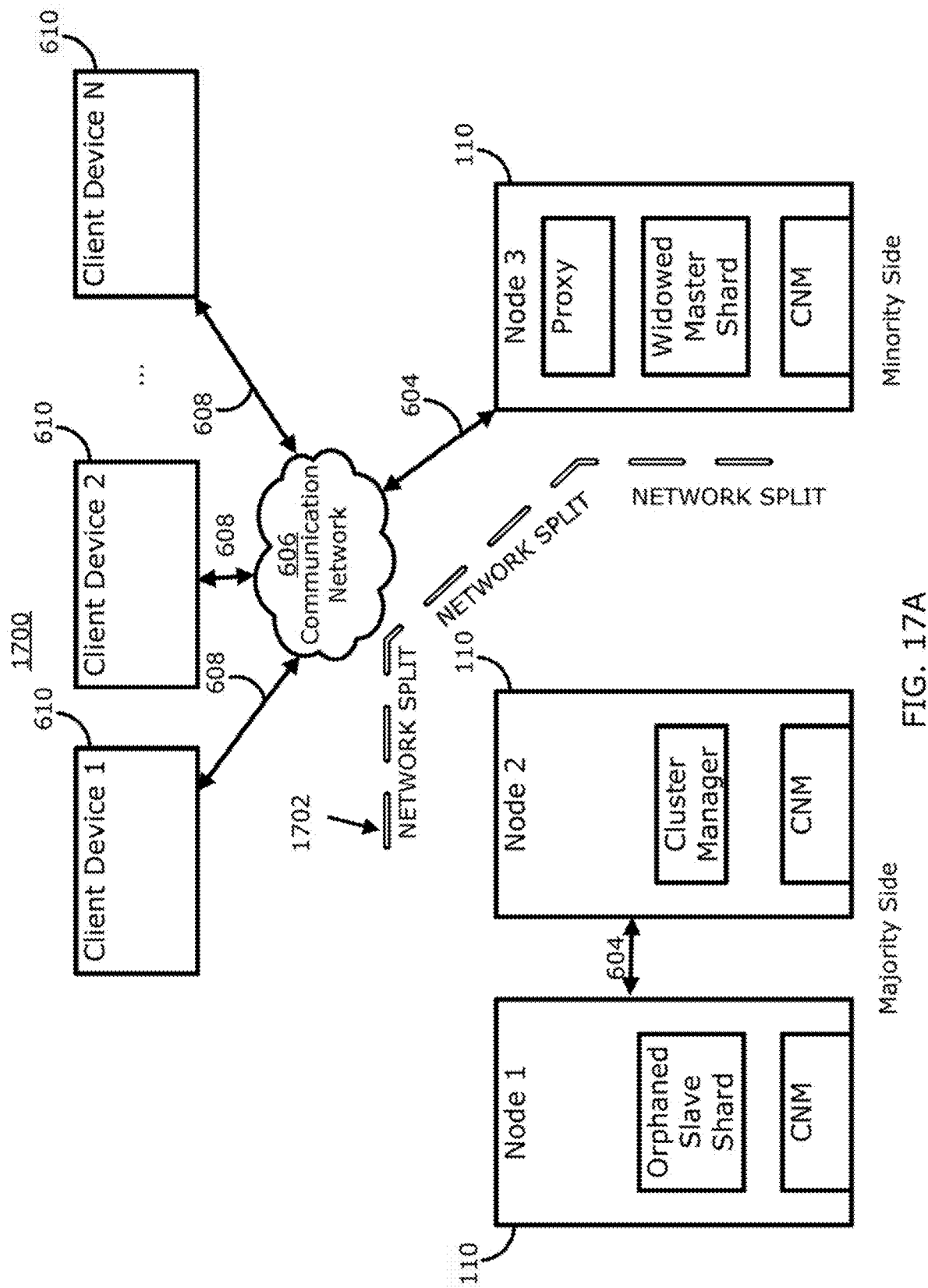
Figure 17B:
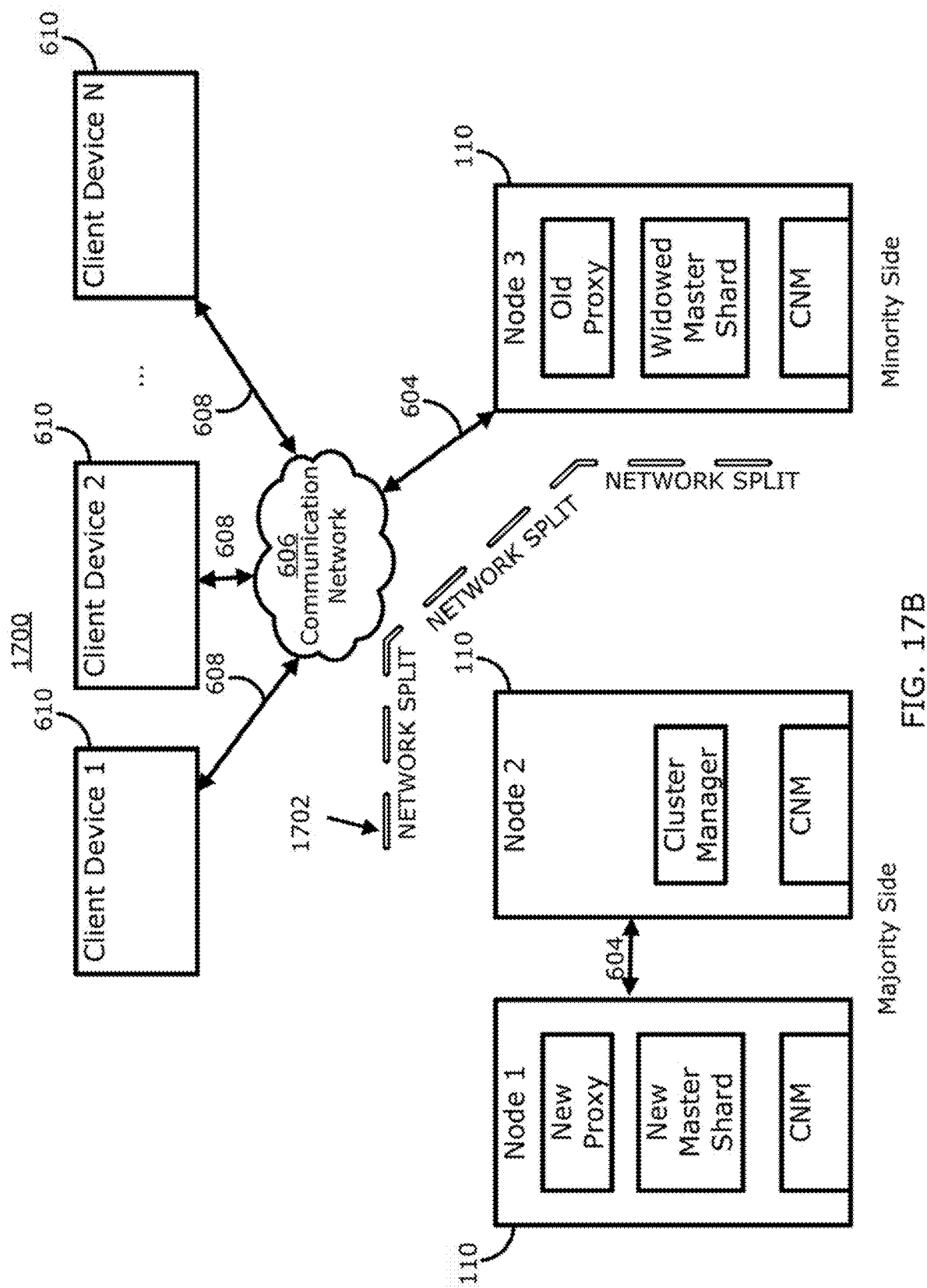
Figure 17C:
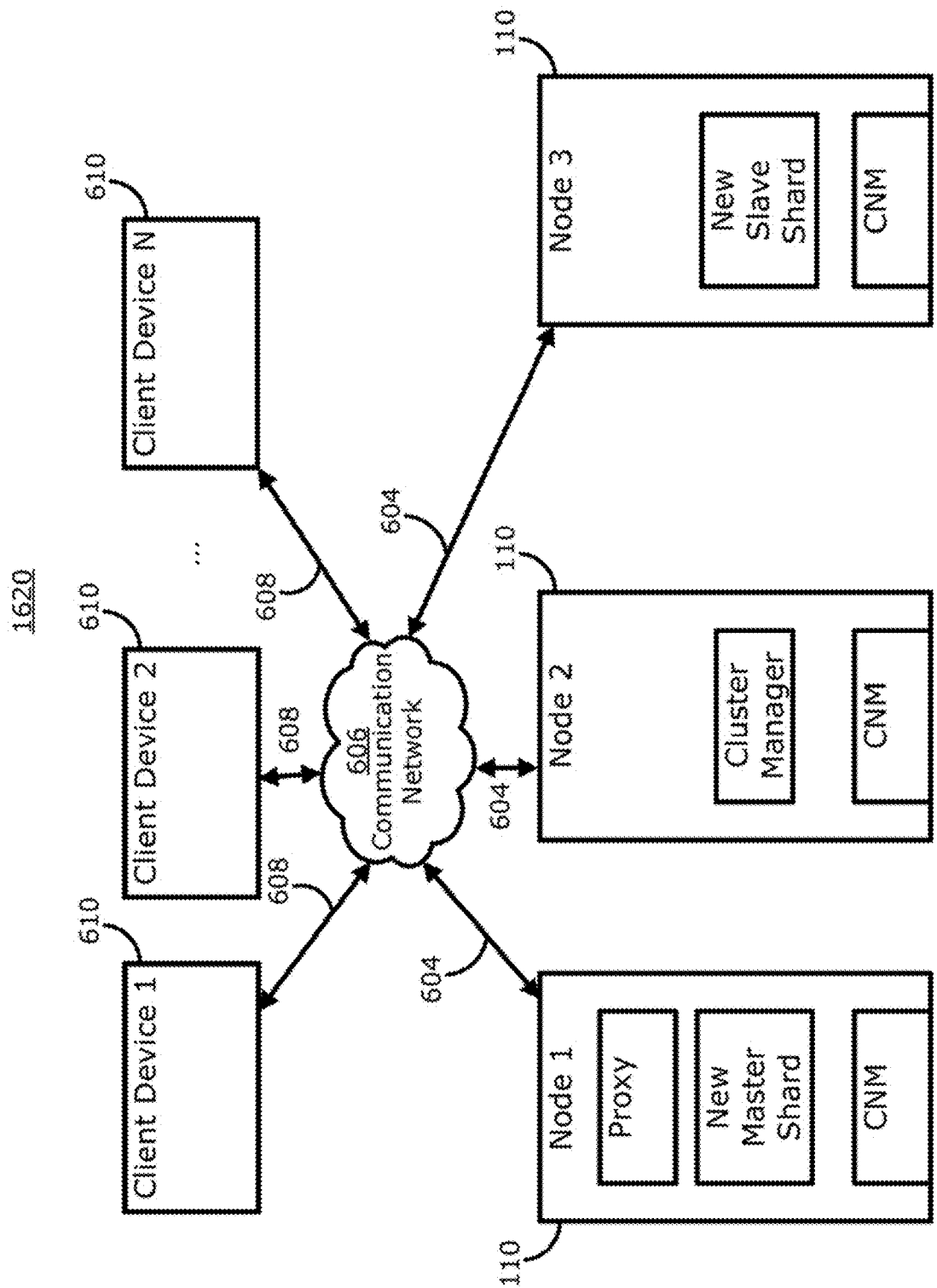

FIG. 17A shows an example 1700 of a configuration of Node 1, Node 2 and Node 3 during a network split represented by dashed line 1702. As shown in configuration 1700, Node 3 hosts a proxy that Client Devices 1-N can contact to attempt to perform operations to at least one object included in the widowed master shard stored in Node 3 and included in the orphaned slave shard stored by Node 1. As described above in connection with FIG. 9, Node 2, acting as the cluster manager node, can determine that no proxy is serving at least one object included in the orphaned slave shard stored by Node 1 (to be re-designated as the master shard) because the proxy hosted by Node 3 is not located on the majority side of the network split. FIG. 17B shows an example of a configuration 1710 of Node 1, Node 2 and Node 3 after a proxy hosted by Node 1 has been designated as the new proxy that serves the object included in the widowed master shard stored by Node 3 and the orphaned slave shard stored by Node 1. However, in configuration 1710 of FIG. 17B, Client Devices 1-N are still not able to access the objects stored in the newly designated master shard because the old proxy cannot communicate with Node 1 which stored the new master shard, and Client Devices 1-N cannot themselves communicate with the new proxy located on the majority side of the network split. Additionally, in some embodiments, any request received from the client devices by the old proxy can be inhibited because the new master shard, located on the majority side, may be changed based on requests from client devices that can communicate with the majority side of the split (not shown). FIG. 17C shows a configuration 1720 of Node 1, Node 2 and Node 3 after network split 1702 has been resolved. As shown in FIG. 17C, the widowed master shard stored by Node 3 can be re-designated as the new slave shard and/or updated by Node 2 acting as the cluster manager node after network split 1702 has been resolved.

Figure 18:
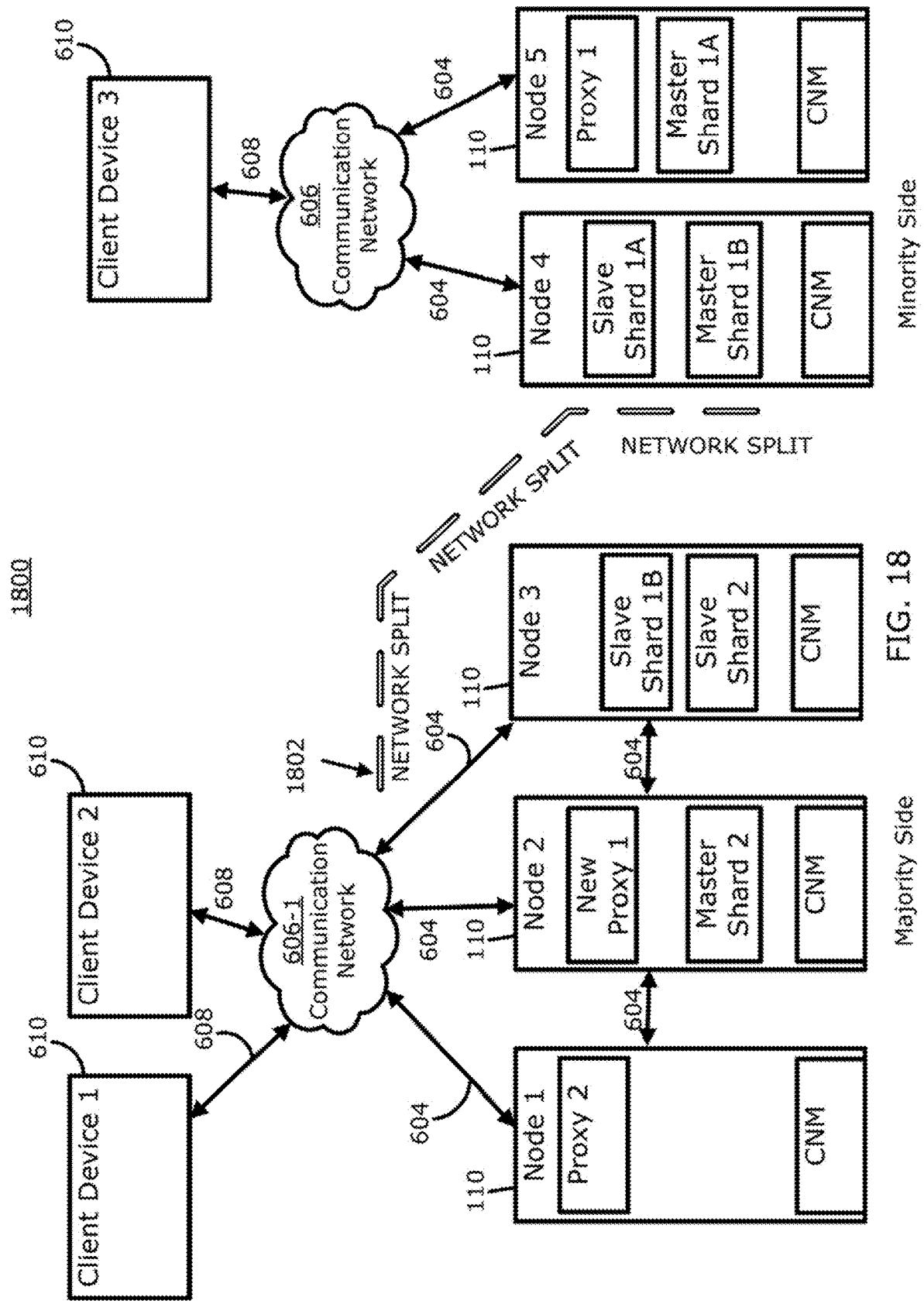

FIG. 18 shows an example 1800 of a configuration of Node 1 to Node 5 during a network split represented by dashed line 1802. As shown in configuration 1800, Node 5 hosts a first proxy (Proxy 1) that Client Device 3 can contact to attempt to perform operations to at least one object included in Master Shard 1A stored by Node 5 and included in Slave Shard 1A stored by Node 4, and to perform operations to another object included in Master Shard 1B stored by Node 4 and included in Slave Shard 1B stored by Node 3. Additionally, in configuration 1800, Node 1 hosts a second proxy (Proxy 2) that Client Device 1 and Client Device 2 can contact to attempt to perform operations to at least one object included in Master Shard 2 stored by Node 2 and included in Slave Shard 2 stored by Node 3. In some embodiments, in configuration 1800, requests from Client Device 3 to Proxy 1 to perform read operations to the object included in Master Shard 1A and Slave Shard 1A can be routed normally because the master and slave cannot diverge due to both being located on the same minority side of the network split. Additionally, in some embodiments requests received from Client Device 3 to Proxy 1 to perform write operations to the object included in master shard 1A and Slave Shard 1A can be inhibited because the minority side lacks a quorum (e.g., as described above in connection with FIGS. 10A and 10B). Alternatively, in some embodiments, requests from Client Device 3 to perform read operations to the object included in master shard 1A and Slave Shard 1A can be inhibited due to lack of a quorum of nodes on the minority side of network split 1802. In some embodiments, requests from Client Device 3 to Proxy 1 to perform read and write operations to the object included in Master Shard 1B and Slave Shard 1B can be inhibited, whereas the same requests received by New Proxy 1 hosted by Node 2 by Client Device 1 or Client Device 2 can be carried out using Slave Shard 1B (e.g., re-designated as New Master Shard 1B). Additionally, as described above in connection with FIG. 12, requests from Client Device 1 and Client Device 2 to Proxy 2 to perform read and write operations to the object included in Master Shard 2 and Slave Shard 2 can be routed normally because the master and slave are both being located on the majority side of network split 1802.

In some embodiments, the mechanisms described herein can include server-side software, client-side software, server-side hardware, client-side hardware, firmware, or any suitable combination thereof. For example, these mechanisms can encompass one or more web pages or web page portions (e.g., via any suitable encoding, such as Hyper Text Markup Language ("HTML"), Dynamic Hyper Text Markup Language ("DHTML"), Extensible Markup Language ("XML"), JavaServer Pages ("JSP"), Active Server Pages ("ASP"), Cold Fusion, or any other suitable approaches). As another example, these mechanisms can encompass a computer program that causes a processor (such as hardware processor 712 and/or hardware processor 722) to execute the mechanisms described herein. For instance, these mechanisms can encompass a computer program written in a programming language recognizable by user device 610, and/or server 206 that is executing the mechanisms (e.g., a program written in a programming language, such as, Java, C, Objective-C, C++, C #, JavaScript, Visual Basic, HTML, XML, ColdFusion, Clojure, Crystal, D, Dart, Elixir, Erlang, Fancy, Go, Haskell, Haxe, Lisp, Lua, MatLab, OCaml, Perl, PHP, Prolog, Pure Data, Python, R, Rebol, Ruby, Rust, Scala, Scheme, Smalltalk, Tcl, any other suitable approaches, or any suitable combination thereof).

In some embodiments, any suitable computer readable media can be used for storing instructions for performing the functions and/or processes described herein. For example, in some embodiments, computer readable media can be transitory or non-transitory. For example, non-transitory computer readable media can include media such as magnetic media (such as hard disks, floppy disks, etc.), optical media (such as compact discs, digital video discs, Blu-ray discs, etc.), semiconductor media (such as random access memory (RAM), flash memory, electrically programmable read only memory (EPROM), electrically erasable programmable read only memory (EEPROM), etc.), any suitable media that is not fleeting or devoid of any semblance of permanence during transmission, and/or any suitable tangible media. As another example, transitory computer readable media can include signals on networks, in wires, conductors, optical fibers, circuits, any suitable media that is fleeting and devoid of any semblance of permanence during transmission, and/ or any suitable intangible media.

In some embodiments of the disclosed subject matter, the above described steps of the processes of FIGS. 3, 9, 10A and 10B can be executed or performed in any order or sequence not limited to the order and sequence shown and described in the figures. Also, some of the above steps of the processes of FIGS. 3, 9, 10A and 10B can be executed or performed substantially simultaneously where appropriate or in parallel to reduce latency and processing times. Furthermore, it should be noted that FIGS. 3, 9, 10A and 10B are provided as examples only. At least some of the steps shown in these figures may be performed in a different order than represented, performed concurrently, or omitted.

The provision of the examples described herein (as well as clauses phrased as "such as," "e.g.," "including," and the like) should not be interpreted as limiting the claimed subject matter to the specific examples; rather, the examples are intended to illustrate only some of many possible aspects. It should also be noted that, as used herein, the term mechanism can encompass hardware, software, firmware, or any suitable combination thereof.

Accordingly, methods, systems, and media for providing distributed database access during a network split are provided.

Although the invention has been described and illustrated in the foregoing illustrative embodiments, it is understood that the present disclosure has been made only by way of example, and that numerous changes in the details of implementation of the invention can be made without departing from the spirit and scope of the invention, which is limited only by the claims that follow. Features of the disclosed embodiments can be combined and rearranged in various ways.

What is claimed is:

1. A method for providing access to information stored in a replicated distributed database, the method comprising:
receiving, using a hardware processor of a first node of N nodes, configuration information of the database which indicates which of the N nodes stores each of a plurality of replicated shards of the database, wherein N is an odd number greater than one and wherein the replicated shards include a plurality of master shards and a plurality of slave shards that each correspond to one master shard;

identifying, after a network split has occurred among the N nodes, a subset of the N nodes, including the first node, which are capable of communicating with each other;

receiving, by a proxy hosted by the first node, a request to perform a write operation to an object in the database;

determining that a second node of the N nodes stores a master shard that includes the object based on the configuration information;

determining that the second node is included in the subset of the N nodes;

determining that the subset includes at least $(N+1)/2$ nodes; and in response to determining that the subset includes at least $(N+1)/2$ nodes, causing the request to perform the write operation to be routed to the second node.

2. The method of claim 1, further comprising:
electing, with the N nodes, a node as a cluster manager node before the network split occurs; and
generating, by the node elected as the cluster manager node, the configuration information of the database.

3. The method of claim 2, further comprising:
determining, with the subset of the N nodes after the network split has occurred, that the node elected as the cluster manager node is not among the subset of N nodes; and
in response to determining that the that the node elected as the cluster manager node is not among the subset of the N nodes, electing a new node from the subset of the N nodes as the new cluster manager node.

4. The method of claim 3, further comprising:
determining, by the node elected as the new cluster manager node, that a slave shard is stored by one of the subset of the N nodes but that the master shard to which it corresponds is not stored by one of the subset of the N nodes; and
updating the configuration information to indicate that the slave shard is to be re-designated as a master shard, and that the master shard to which it corresponds is to be re-designated as a slave shard.

5. The method of claim 1, further comprising:
receiving, at a third node of the N nodes, the configuration information;
identifying, after a network split has occurred, a second subset of the N nodes, including the third node, which are capable of communicating with each other;
receiving, by a proxy hosted by the third node, a request to perform a write operation to a second object in the database;
determining that the second subset includes less than $(N+1)/2$ nodes; and
in response to determining that the subset includes less than $(N+1)/2$ nodes, inhibiting the write operation from being performed.

6. The method of claim 5, further comprising:
receiving, by the proxy hosted by the third node, a request to perform a read operation to a third object in the database;
determining which of the N nodes stores a master shard that includes the third object;
determining which of the N nodes stores a slave shard that includes the third object;
determining whether both the master shard storing the third object and the slave shard storing the third object are stored by nodes in the second subset of the N nodes; and
in response to determining that both the second master shard and the slave shard are stored by nodes in the second subset of the N nodes, causing the read operation to be routed to the node storing the master shard that includes the third object or the node storing the slave shard that includes the third object.

7. The method of claim 1, wherein identifying the subset of the N nodes, including the first node, which are capable of communicating with each other with comprises:
receiving, at the first node during a period of time subsequent to the network split occurring, a message from each node in the subset of the N nodes, wherein the message indicates at least that the first node is in communication with the node that sent the message; and
determining, at the first node, that a message has not been received from each node not in the subset of the N nodes during the period of time subsequent to the network split.

8. The method of claim 1, wherein the request to perform the write operation to the object in the database includes a key corresponding to the object.

9. The method of claim 1, wherein the database is a non-relational database.

10. The method of claim 9, wherein the database is an in-memory non-relational database.

11. A system for providing access to information stored in a replicated distributed database, the system comprising:
at least one hardware processor that is programmed to:
receive, at a first node of N nodes, configuration information of the database which indicates which of the N nodes stores each of a plurality of replicated shards of the database, wherein N is an odd number greater than one and wherein the replicated shards include a plurality of master shards and a plurality of slave shards that each correspond to one master shard;
identify, after a network split has occurred among the N nodes, a subset of the N nodes, including the first node, which are capable of communicating with each other;
receive, by a proxy hosted by the first node, a request to perform a write operation to an object in the database;
determining that a second node of the N nodes stores a master shard that includes the object based on the configuration information;
determining that the second node is included in the subset of the N nodes;
determining that the subset includes at least $(N+1)/2$ nodes; and
in response to determining that the subset includes at least $(N+1)/2$ nodes, causing the request to perform the write operation to be routed to the second node.

12. The system of claim 11, wherein the at least one hardware processor is further programmed to:
elect, with the N nodes, a node as a cluster manager node before the network split occurs; and
generate, by the node elected as the cluster manager node, the configuration information of the database.

13. The system of claim 12, wherein the at least one hardware processor is further programmed to:

determine, with the subset of the N nodes after the network split has occurred, that the node elected as the cluster manager node is not among the subset of N nodes; and in response to determining that the that the node elected as the cluster manager node is not among the subset of the N nodes, elect a new node from the subset of the N nodes as the new cluster manager node.

14. The system of claim 13, wherein the at least one hardware processor is further programmed to:

determine, by the node elected as the new cluster manager node, that a slave shard is stored by one of the subset of the N nodes but that the master shard to which it corresponds is not stored by one of the subset of the N nodes; and update the configuration information to indicate that the slave shard is to be re-designated as a master shard, and that the master shard to which it corresponds is to be re-designated as a slave shard.

15. The system of claim 11, wherein the at least one hardware processor is further programmed to:

receive, at a third node of the N nodes, the configuration information;

identify, after a network split has occurred, a second subset of the N nodes, including the third node, which are capable of communicating with each other;

receive, by a proxy hosted by the third node, a request to perform a write operation to a second object in the database;

determine that the second subset includes less than (N+1)/2 nodes; and in response to determining that the subset includes less than (N+1)/2 nodes, inhibit the write operation from being performed.

16. The system of claim 15, wherein the at least one hardware processor is further programmed to:

receive, by the proxy hosted by the third node, a request to perform a read operation to a third object in the database;

determine which of the N nodes stores a master shard that includes the third object;

determine which of the N nodes stores a slave shard that includes the third object;

determine whether both the master shard storing the third object and the slave shard storing the third object are stored by nodes in the second subset of the N nodes; and in response to determining that both the second master shard and the slave shard are stored by nodes in the second subset of the N nodes, cause the read operation to be routed to the node storing the master shard that includes the third object or the node storing the slave shard that includes the third object.

17. The system of claim 11, wherein the at least one hardware processor is further programmed to:

receive, at the first node during a period of time subsequent to the network split occurring, a message from each node in the subset of the N nodes, wherein the message indicates at least that the first node is in communication with the node that sent the message; and determine, at the first node, that a message has not been received from each node not in the subset of the N nodes during the period of time subsequent to the network split.

18. The system of claim 11, wherein the request to perform the write operation to the object in the database includes a key corresponding to the object.

19. The system of claim 11, wherein the database is a non-relational database.

20. The system of claim 19, wherein the database is an in-memory non-relational database.

21. A non-transitory computer-readable medium containing computer executable instructions that, when executed by a processor, cause the processor to perform a method for providing access to information stored in a replicated distributed database, the method comprising:

receiving, by a first node of N nodes, configuration information of the database which indicates which of the N nodes stores each of a plurality of replicated shards of the database, wherein N is an odd number greater than one and wherein the replicated shards include a plurality of master shards and a plurality of slave shards that each correspond to one master shard;

identifying, after a network split has occurred among the N nodes, a subset of the N nodes, including the first node, which are capable of communicating with each other;

receiving, by a proxy hosted by the first node, a request to perform a write operation to an object in the database;

determining that a second node of the N nodes stores a master shard that includes the object based on the configuration information;

determining that the second node is included in the subset of the N nodes;

determining that the subset includes at least (N+1)/2 nodes; and in response to determining that the subset includes at least (N+1)/2 nodes, causing the request to perform the write operation to be routed to the second node.

22. The non-transitory computer-readable medium of claim 21, wherein the method further comprises:

electing, with the N nodes, a node as a cluster manager node before the network split occurs; and generating, by the node elected as the cluster manager node, the configuration information of the database.

23. The non-transitory computer-readable medium of claim 21, wherein the method further comprises:

determining, with the subset of the N nodes after the network split has occurred, that the node elected as the cluster manager node is not among the subset of N nodes; and in response to determining that the that the node elected as the cluster manager node is not among the subset of the N nodes, electing a new node from the subset of the N nodes as the new cluster manager node.

24. The non-transitory computer-readable medium of claim 23, wherein the method further comprises:

determining, by the node elected as the new cluster manager node, that a slave shard is stored by one of the subset of the N nodes but that the master shard to which it corresponds is not stored by one of the subset of the N nodes; and updating the configuration information to indicate that the slave shard is to be re-designated as a master shard, and that the master shard to which it corresponds is to be re-designated as a slave shard.

25. The non-transitory computer-readable medium of claim 21, wherein the method further comprises:

receiving, at a third node of the N nodes, the configuration information;

identifying, after a network split has occurred, a second subset of the N nodes, including the third node, which are capable of communicating with each other;

receiving, by a proxy hosted by the third node, a request to perform a write operation to a second object in the database;

determining that the second subset includes less than (N+1)/2 nodes; and in response to determining that the subset includes less than (N+1)/2 nodes, inhibiting the write operation from being performed.

26. The non-transitory computer-readable medium of claim 25, wherein the method further comprises:

receiving, by the proxy hosted by the third node, a request to perform a read operation to a third object in the database;

determining which of the N nodes stores a master shard that includes the third object;

determining which of the N nodes stores a slave shard that includes the third object;

determining whether both the master shard storing the third object and the slave shard storing the third object are stored by nodes in the second subset of the N nodes; and in response to determining that both the second master shard and the slave shard are stored by nodes in the second subset of the N nodes, causing the read operation to be routed to the node storing the master shard that includes the third object or the node storing the slave shard that includes the third object.

27. The non-transitory computer-readable medium of claim 21, wherein identifying the subset of the N nodes which the first node is still capable of communicating with comprises:

receiving, at the first node during a period of time subsequent to the network split occurring, a message from each node in the subset of the N nodes, wherein the message indicates at least that the first node is in communication with the node that sent the message; and determining, at the first node, that a message has not been received from each node not in the subset of the N nodes during the period of time subsequent to the network split.

28. The non-transitory computer-readable medium of claim 21, wherein the request to perform the write operation to the object in the database includes a key corresponding to the object.

29. The non-transitory computer-readable medium of claim 21, wherein the database is a non-relational database.

30. The non-transitory computer-readable medium of claim 29, wherein the database is an in-memory non-relational database.

* * * * *